US011127009B2

(12) United States Patent
Khan et al.

(10) Patent No.: US 11,127,009 B2
(45) Date of Patent: Sep. 21, 2021

(54) METHODS AND SYSTEMS FOR USING A MOBILE DEVICE TO EFFECT A SECURE ELECTRONIC TRANSACTION

(71) Applicant: Omnyway Inc., Redwood City, CA (US)

(72) Inventors: Mohammad Khan, San Jose, CA (US); Ashok Narasimhan, San Francisco, CA (US); William N. Melton, San Francisco, CA (US)

(73) Assignee: Omnyway, Inc., Redwood City, CA (US)

( * ) Notice: Subject to any disclaimer, the term of this patent is extended or adjusted under 35 U.S.C. 154(b) by 943 days.

(21) Appl. No.: 15/093,694

(22) Filed: Apr. 7, 2016

(65) Prior Publication Data

US 2016/0300237 A1 Oct. 13, 2016

Related U.S. Application Data

(60) Provisional application No. 62/144,014, filed on Apr. 7, 2015.

(51) Int. Cl.
*G06Q 20/40* (2012.01)
*G06Q 20/32* (2012.01)
(Continued)

(52) U.S. Cl.
CPC ..... *G06Q 20/40145* (2013.01); *G06Q 10/083* (2013.01); *G06Q 20/3223* (2013.01);
(Continued)

(58) Field of Classification Search
CPC .......... G06Q 20/3223; G06Q 20/3276; G06Q 20/4014; G06Q 10/083
(Continued)

(56) References Cited

U.S. PATENT DOCUMENTS 7,483,858 B2   1/2009   Foran et al.
8,380,177 B2   2/2013   Laracey
(Continued)

FOREIGN PATENT DOCUMENTS

EP   0708547 A2   4/1996
EP   2747016 A2   6/2014
(Continued)

OTHER PUBLICATIONS

International Search Report and Written Opinion for International Patent Application No. PCT/US2016/054028, dated Jan. 16, 2017, 12 pages.

(Continued)

*Primary Examiner* — Toan C Ly
(74) *Attorney, Agent, or Firm* — Lowenstein Sandler LLP

(57) ABSTRACT

According to one aspect, the subject matter described herein includes a method for using a mobile device to effect a secure electronic transaction. In one embodiment, the method includes, at a mobile backend server comprising one or more processors: receiving, from a mobile device of a user that is engaged in or desires to engage in an electronic transaction with an entity other than the user, first information that identifies the user and second information that directly or indirectly identifies the electronic transaction, wherein the second information does not contain payment information for the user; using the first information to identify the user; determining user payment information for the identified user; using the second information to identify a target for the payment information; and sending the user payment information to the identified target for use to initiate the electronic transaction.

54 Claims, 10 Drawing Sheets

(51) Int. Cl.
*G06Q 10/08* (2012.01)
*G06Q 20/38* (2012.01)
*G06Q 30/02* (2012.01)

(52) U.S. Cl.
CPC ..... *G06Q 20/3272* (2013.01); *G06Q 20/3276* (2013.01); *G06Q 20/3825* (2013.01); *G06Q 20/4012* (2013.01); *G06Q 20/4014* (2013.01); *G06Q 30/0226* (2013.01)

(58) Field of Classification Search
USPC ....................................................... 235/383
See application file for complete search history.

(56) References Cited

U.S. PATENT DOCUMENTS

| | | | |
|---|---|---|---|
| 8,417,633 B1 | 4/2013 | Chmara et al. | |
| 8,516,562 B2 | 8/2013 | Headley | |
| 8,620,754 B2 | 12/2013 | Fisher | |
| 8,632,000 B2 | 1/2014 | Laracey | |
| 8,677,116 B1 | 3/2014 | Bicer | |
| 8,849,705 B2 | 9/2014 | Khan et al. | |
| 8,965,800 B2 | 2/2015 | Soysa et al. | |
| 9,009,468 B1 | 4/2015 | Zayed | |
| 9,082,119 B2 | 7/2015 | Ortiz et al. | |
| 9,183,549 B2 | 11/2015 | Kapur et al. | |
| 9,208,482 B2 | 12/2015 | Laracey | |
| 9,305,295 B2 | 4/2016 | Laracey | |
| 10,445,739 B1* | 10/2019 | Sahni | G06Q 20/382 |
| 2002/0152123 A1 | 10/2002 | Giordano et al. | |
| 2005/0096011 A1 | 5/2005 | Yoshida et al. | |
| 2006/0006224 A1 | 1/2006 | Modi | |
| 2006/0036485 A1 | 2/2006 | Duri et al. | |
| 2008/0004951 A1 | 1/2008 | Huang et al. | |
| 2008/0010190 A1 | 1/2008 | Rackley, III et al. | |
| 2010/0030687 A1 | 2/2010 | Panthaki et al. | |
| 2010/0252624 A1* | 10/2010 | Van de Velde | G06Q 20/045 235/382 |
| 2010/0287057 A1 | 11/2010 | Aihara et al. | |
| 2010/0320266 A1 | 12/2010 | White | |
| 2011/0137742 A1 | 6/2011 | Parikh | |
| 2011/0251910 A1 | 10/2011 | Dimmick | |
| 2011/0270751 A1 | 11/2011 | Csinger et al. | |
| 2011/0307318 A1 | 12/2011 | LaPorte et al. | |
| 2012/0078792 A1 | 3/2012 | Bacastow et al. | |
| 2012/0136739 A1 | 5/2012 | Chung | |
| 2012/0143752 A1 | 6/2012 | Wong et al. | |
| 2012/0203605 A1 | 8/2012 | Morgan et al. | |
| 2012/0209749 A1 | 8/2012 | Hammad et al. | |
| 2012/0253913 A1 | 10/2012 | Richard | |
| 2012/0265685 A1 | 10/2012 | Brudnicki et al. | |
| 2012/0296725 A1 | 11/2012 | Dessert et al. | |
| 2013/0006776 A1 | 1/2013 | Miller et al. | |
| 2013/0013499 A1* | 1/2013 | Kalgi | G06Q 20/12 705/41 |
| 2013/0013502 A1 | 1/2013 | Purvis | |
| 2013/0054413 A1 | 2/2013 | Brendell et al. | |
| 2013/0080329 A1* | 3/2013 | Royyuru | G06Q 30/00 705/44 |
| 2013/0124413 A1 | 5/2013 | Itwaru | |
| 2013/0138518 A1 | 5/2013 | White et al. | |
| 2013/0159186 A1 | 6/2013 | Brudnicki et al. | |
| 2013/0191174 A1 | 7/2013 | Zhou et al. | |
| 2013/0212019 A1 | 8/2013 | Mattsson et al. | |
| 2013/0238455 A1 | 9/2013 | Laracey | |
| 2013/0275307 A1 | 10/2013 | Khan | |
| 2013/0311313 A1 | 11/2013 | Laracey | |
| 2013/0311375 A1 | 11/2013 | Priebatsch | |
| 2013/0311382 A1 | 11/2013 | Fosmark et al. | |
| 2013/0317928 A1 | 11/2013 | Laracey | |
| 2013/0325569 A1 | 12/2013 | Holmes et al. | |
| 2014/0025391 A1 | 1/2014 | Knowles et al. | |
| 2014/0040139 A1 | 2/2014 | Brudnicki et al. | |
| 2014/0058862 A1 | 2/2014 | Celkonas | |
| 2014/0108252 A1 | 4/2014 | Itwaru et al. | |
| 2014/0108263 A1 | 4/2014 | Ortiz et al. | |
| 2014/0136353 A1 | 5/2014 | Goldman et al. | |
| 2014/0149293 A1 | 5/2014 | Laracey | |
| 2014/0164237 A1 | 6/2014 | Blanco et al. | |
| 2014/0188701 A1 | 7/2014 | Sreedhararaj et al. | |
| 2014/0214619 A1 | 7/2014 | Cancro et al. | |
| 2014/0278965 A1 | 9/2014 | Douglas et al. | |
| 2015/0039452 A1 | 2/2015 | Barve et al. | |
| 2015/0058300 A1 | 2/2015 | Perczynski et al. | |
| 2015/0120475 A1 | 4/2015 | Pedley et al. | |
| 2015/0142604 A1 | 5/2015 | Kneen | |
| 2015/0178732 A1 | 6/2015 | Laracey | |
| 2015/0180836 A1 | 6/2015 | Wong et al. | |
| 2015/0186871 A1 | 7/2015 | Laracey | |
| 2015/0248664 A1 | 9/2015 | Makhdumi et al. | |
| 2015/0287037 A1 | 10/2015 | Salmon et al. | |
| 2016/0071094 A1* | 3/2016 | Krishnaiah | G06Q 20/363 705/66 |
| 2016/0071115 A1 | 3/2016 | Oh et al. | |
| 2016/0155145 A1 | 6/2016 | Katz et al. | |
| 2016/0225063 A1 | 8/2016 | Wical | |

FOREIGN PATENT DOCUMENTS

| | | |
|---|---|---|
| EP | 2905735 A1 | 8/2015 |
| JP | 2007299316 A | 11/2007 |
| WO | 02097575 A2 | 12/2002 |
| WO | 2012151660 A1 | 11/2012 |
| WO | 2012158057 A1 | 11/2012 |
| WO | 2013023499 A1 | 2/2013 |
| WO | 2013066910 A1 | 5/2013 |
| WO | 2013115700 A2 | 8/2013 |
| WO | 2014128351 A1 | 8/2014 |
| WO | 2014164647 A1 | 10/2014 |
| WO | 2015039254 A1 | 3/2015 |
| WO | 2015058300 A1 | 4/2015 |
| WO | 2015095517 A1 | 6/2015 |
| WO | 2015157403 A1 | 10/2015 |
| WO | 2016164648 A1 | 10/2016 |
| WO | 2016183508 A1 | 11/2016 |
| WO | 2016191325 A1 | 12/2016 |
| WO | 2017023757 A1 | 2/2017 |
| WO | 2017030608 A1 | 2/2017 |
| WO | 2017031469 A1 | 2/2017 |
| WO | 2017031481 A1 | 2/2017 |
| WO | 2017044642 A1 | 3/2017 |
| WO | 2017044981 A1 | 3/2017 |
| WO | 2017054011 A1 | 3/2017 |

OTHER PUBLICATIONS

Final Office Action for U.S. Appl. No. 14/986,592, dated Dec. 14, 2016, 41 pages.
International Search Report and Written Opinion for International Patent Application No. PCT/US2016/047930, dated Nov. 23, 2016, 13 pages.
International Search Report and Written Opinion for International Patent Application No. PCT/US2016/051386, dated Dec. 13, 2016, 11 pages.
Advisory Action for U.S. Appl. No. 14/986,592, dated Mar. 28, 2017, 3 pages.
International Preliminary Report on Patentability for International Patent Application No. PCT/US2016/047898, dated Mar. 1, 2018, 7 pages.
International Preliminary Report on Patentability for International Patent Application No. PCT/US2016/044725, dated Feb. 15, 2018, 7 pages.
International Preliminary Report on Patentability for International Patent Application No. PCT/US2016/021798, dated Mar. 1, 2018, 9 pages.
International Preliminary Report on Patentability for International Patent Application No. PCT/US2016/047930, dated Mar. 1, 2018, 9 pages.
Examinees Answer to Appeal Brief for U.S. Appl. No. 14/986,592, dated Mar. 2, 2018, 21 pages.

(56) References Cited

OTHER PUBLICATIONS

International Preliminary Report on Patentability for International Patent Application No. PCT/US2016/050800, dated Mar. 22, 2018, 7 pages.
International Preliminary Report on Patentability for International Patent Application No. PCT/US2016/051386, dated Mar. 22, 2018, 7 pages.
International Preliminary Report on Patentability for International Patent Application No. PCT/US2016/054028, dated Apr. 5, 2018, 8 pages.
Nguyen, Judy, "An Analysis and Comparison of E-Commerce Transaction Protocols—Purchasing Order," A Survey Paper for the completion of CMPE 298, Summer 1999, SJSU, 66 pages.
International Search Report and Written Opinion for International Patent Application No. PCT/US2016/033675, dated Jul. 21, 2016, 10 pages.
International Search Report and Written Opinion for International Patent Application No. PCT/US2016/026531, dated Jun. 29, 2016, 11 pages.
Non-Final Office Action for U.S. Appl. No. 14/986,592, dated May 20, 2016, 26 pages.
International Search Report and Written Opinion for International Patent Application No. PCT/US2016/021798, dated Jun. 1, 2016, 13 pages.
Examination Report No. 1 for Australian Patent Application No. 2016244847, dated Nov. 20, 2018, 5 page.
Non-Final Office Action for U.S. Appl. No. 15/161,219, dated Jan. 8, 2019, 44 pages.
International Search Report and Written Opinion for International Patent Application No. PCT/US2018/041025, dated Sep. 19, 2018, 19 pages.
International Search Report and Written Opinion for International Patent Application No. PCT/IB2018/056209, dated Nov. 9, 2018, 13 pages.
International Preliminary Report on Patentability for International Patent Application No. PCT/US2016/033675, dated Dec. 7, 2017, 7 pages.
International Preliminary Report on Patentability for International Patent Application No. PCT/US2016/026531, dated Oct. 19, 2017, 8 pages.
International Preliminary Report on Patentability for International Patent Application No. PCT/US2016/032509, dated Nov. 23, 2017, 9 pages.
Examinees Answer to Appeal Brief for U.S. Appl. No. 14/986,592, dated Nov. 20, 2017, 21 pages.
International Search Report and Written Opinion for International Patent Application No. PCT/US2016/047898, dated Nov. 3, 2016, 10 pages.
International Search Report and Written Opinion for International Patent Application No. PCT/US2016/032509, dated Oct. 4, 2016, 12 pages.
International Search Report and Written Opinion for International Patent Application No. PCT/US20161044725, dated Sep. 16, 2016, 11 pages.
International Search Report and Written Opinion for International Patent Application No. PCT/US2016/050800, dated Oct. 21, 2016, 10 pages.
Examination Report for European Patent Application No. 16781927.5, dated Feb. 22, 2019, 7 pages.
Examination Report for European Patent Application No. 16736279.7, dated Feb. 11, 2019, 7 pages.
Final Office Action for U.S. Appl. No. 15/763,811, dated Oct. 31, 2019, 43 pages.
Non-Final Office Action for U.S. Appl. No. 16/014,992, dated Oct. 17, 2019, 44 pages.
Non-Final Office Action for U.S. Appl. No. 15/629,488, dated Nov. 15, 2019, 34 pages.
Non-Final Office Action for U.S. Appl. No. 15/753,482, dated Sep. 19, 2019, 22 page.
Non-Final Office Action for U.S. Appl. No. 15/758,688, dated Nov. 8, 2019, 29 pages.
Decision on Appeal for U.S. Appl. No. 14/986,592, dated Aug. 23, 2019, 38 pages.

\* cited by examiner

METHODS AND SYSTEMS FOR USING A MOBILE DEVICE TO EFFECT A SECURE ELECTRONIC TRANSACTION

RELATED APPLICATIONS

This application claims the benefit of provisional patent application Ser. No. 62/144,014, filed Apr. 7, 2015, the disclosure of which is hereby incorporated herein by reference in its entirety.

TECHNICAL FIELD

This disclosure relates to performing secure financial and non-financial electronic transactions made by consumers. More specifically, it relates to methods and systems for using a mobile device to effect a secure electronic transaction.

BACKGROUND

Credit cards, debit cards, prepaid cards and other conventional instruments for making financial transactions have an inherent insecurity: namely, that sensitive information—i.e., information required in order to perform a transaction—such as information that directly or indirectly (e.g., through a token or a pointer) identifies the financial institution, the account at that institution, or the identity of the owner of that account, as well as passwords, personal identity numbers (PINs), expiration date, name, and the like—herein referred to as "payment information"—is transmitted between the point of sale (POS) terminal and the servers that receive and process this information, referred to as the "payment backend". Despite measures taken to protect this sensitive information from being intercepted or viewed by unauthorized persons or entities that may misuse or illegally use such information, misappropriation and/or misuse of payment information for fraudulent transactions continues to be a problem.

The data connection between a typical POS terminal, such as a card reader, for example, and a payment authorization network is increasingly encrypted, requiring a decryption key to view the encrypted data as plain text. Nevertheless, payment sensitive information was able to be stolen from the POS terminals/networks of multiple major department stores in the United States by thieves who installed into the POS terminal software (malware) that would intercept and store the magnetic stripe data (including the bank identifier, the bank account number, and the account owner's name)—e.g., everything needed to then illegally make purchases using the buyer's credit, debit, or prepaid card at physical stores and more frequently through online electronic commerce sites (i.e., online stores) globally. Thus, despite measures taken to obscure and protect sensitive information by payment industry security requirements, the fact remains that the sensitive information in large quantity can be stolen through POS terminals/networks, merchant databases, and other means and can be fraudulently played for a successful financial transaction.

Another problem with conventional credit card reader transactions is that these systems use very primitive authentication systems to guarantee that the person making the transaction is who they say they are, i.e., to authenticate the user. For example, in physical stores environments, mostly credit and prepaid transactions, and less frequently debit card transactions performed at a point of sale terminal are typically done with a signature on a receipt and without requiring any authentication or verification of a buyer electronically, e.g., through an entry of his or her Personal Identification Number (PIN). Whereas most of the debit card transactions are typically done with the entry of a four-to-six digit PIN at a secured POS PIN pad reader. However, the trend is growing among buyers driven by convenience to use their debit cards without entering any PIN at POS and just providing a signature on a receipt. There continue to be increasing chances of fraud at physical POS using stolen credit, debit, and prepaid payment sensitive information due to lack of a buyer authentication at a POS. Although there is a wealth of other data that may be used to authenticate a person's identity, e.g., biometric data, passcodes or passphrases, digital signatures, etc., conventional POS terminals have no means to receive that data, much less use that data to authenticate the person performing the transaction A bigger problem is with online electronic commerce stores where payment for online purchases are done remotely through entering payment sensitive information manually and without requiring buyers to provide almost no authentication or verification information today. This has been a major problem, and has provided very easy door for making fraudulent payment transactions with payment sensitive data stolen in large quantities from merchants' POS terminals/networks, databases, and through other means. This type of fraud is increasing globally; for example, payment sensitive data stolen from the United States could be used to make online purchases anywhere in the world.

Making on-line purchases at an e-commerce site can also be time consuming, requiring that the consumer enter a name, a shipping address, a billing address, a shipping preference, membership numbers, coupons or redeem codes, and so on. Web-based payment portals are essentially software front-ends to legacy payment networks, so ecommerce sites have no direct way to collect any kind of authentication information, e.g., the legacy payment networks expect to have the PIN mentioned above entered by a buyer on a physically secured PIN pad, which, in the case of ecommerce transactions, is not practically possible because of the remote presence between a buyer and an ecommerce site. Furthermore, since it is not necessary to physically possess a credit card, for example, to enter credit card data into an e-commerce site, such payment transactions are treated as a "card-not-present" payment transaction, which typically has a much higher transaction fee to a merchant than a "card present" payment transaction at a POS terminal.

While these concerns are usually raised in the context of financial transactions, it may be desirable to protect non-financial transactions as well. The problems of security and ease of use apply to all forms of electronic transactions, including both payment and non-payment electronic transactions.

What is needed, therefore, is a way for users to securely perform electronic transactions, both offline (e.g., at physical POS terminals) and online (e.g., via ecommerce websites or other type of web site), without exposing sensitive information to possible detection or interception. It would also be highly desirable to provide the means to more strongly authenticate the user's (buyer's) identity. It would also be desirable to streamline the process of providing user billing and shipping addresses and other commonly required information in a secure and convenient manner. More specifically, there is a need for methods and systems for using a mobile device to effect a secure electronic transaction involving securing sensitive information, authenticating the user, and make it easy to provide additional transaction assistance information (e.g., shipping instructions)

SUMMARY

The subject matter disclosed herein includes methods and systems for using a mobile device to effect a secure electronic transaction.

According to one aspect, the subject matter described herein includes a method for using a mobile device to effect a secure electronic transaction. In one embodiment, the method includes, at a mobile backend server comprising one or more processors: receiving, from a mobile device of a user that is engaged in or desires to engage in an electronic transaction with an entity other than the user, first information that identifies the user and second information that directly or indirectly identifies the electronic transaction, wherein the second information does not contain payment information for the user; using the first information to identify the user; determining user payment information for the identified user; using the second information to identify a target for the payment information; and sending the user payment information to the identified target for use to initiate the electronic transaction.

In one embodiment, the entity other than the user may comprise an ecommerce website, a point of sale (POS) terminal, a kiosk, an unattended terminal, an automatic teller machine (ATM), a print advertisement, a social media webpage, a product display, or an image of a good or service.

In one embodiment, the identified target may comprise a POS terminal, a merchant backend server, a merchant ecommerce server, or a payment server that is hosting a payment process that is associated with the electronic transaction.

In one embodiment, the second information includes at least one of: a session ID; a uniform resource identifier or network address of the mobile backend server; information identifying the computing platform; information identifying a session owner; and information identifying the user. In one embodiment, the second information was received by the mobile device via visual transmission. In one embodiment, the second information was received by the mobile device as a QR code. In one embodiment, the QR code was provided by the entity other than the user. In one embodiment, the second information was received by the mobile device a graphic image containing the second information embedded as steganographic information. In one embodiment, the second information was received by the mobile device via audio transmission, wireless transmission, or manual entry. In one embodiment, the second information was received by the mobile device as a media file. In one embodiment, the mobile backend server receives the first and second information via a session established with the mobile device.

In one embodiment, the mobile backend server uses a payment preference of the user to determine payment information for the user. In one embodiment, the mobile backend server received the payment preference of the user from the mobile device. In one embodiment, the mobile backend server uses a shipping preference of the user to determine shipping instructions for the user. In one embodiment, the mobile backend server received the shipping preference of the user from the mobile device. In one embodiment, prior to sending the user payment information to the identified target by the mobile backend server, the mobile backend server sends shipping instructions to the identified target, receives from the identified target a total payment amount for the transaction, including at least one of shipping fees and taxes levied, sends the total payment amount to the user, and receives authorization to complete the transaction from the user. In one embodiment, receiving authorization to complete the transaction includes authenticating the user of the mobile device. In one embodiment, authenticating the user includes receiving notification from the mobile device that the user was authenticated. In one embodiment, authenticating the user includes receiving information with which the mobile backend server authenticates the user. In one embodiment, the information for identifying or authenticating the identity of the user includes at least one of: a name of the user; an address of the user; an identification number associated with the user; biometric information provided by the user; a password, passcode, or personal information number (PIN) of the user; a digital signature of the user; a geo-location of the user; or information from the user's social network.

In one embodiment, sending the user payment information includes sending the information via a session established between the mobile backend server and the identified target. In one embodiment, the user payment information comprises a token that represents payment information to be redeemed by the identified target to determine the payment information. In one embodiment, the payment information includes at least one of: information that identifies a financial institution; a name of the user; or information identifying the user's membership in a loyalty, rewards, or discount program.

In one embodiment, the electronic transaction comprises a "card present" transaction. In one embodiment, the electronic transaction comprises a payment transaction or a non-payment transaction. In one embodiment, the requested ecommerce transaction comprises at least one of: a payment or purchase; a credit transaction; a debit transaction; a deposit; a withdrawal; a money transfer; a transaction involving a loyalty program; a transaction involving a rewards program; a transaction involving a diet, health, or fitness program; a transaction involving coupons and offers; a transaction involving funds collection; a transaction involving utility payments; a transaction involving automatic payments or drafts; a transaction involving scheduled withdrawals; or a transaction involving recurring payments. In one embodiment, the first or second information is encoded such that one portion of the data cannot be modified or tampered with without causing another portion of the data to also be modified. In one embodiment, the second information includes a sequence counter to prevent replay attacks.

According to another aspect, the subject matter described herein includes a system for using a mobile device to effect a secure electronic transaction. In one embodiment, the system includes a mobile backend server for using a mobile device to effect a secure electronic transaction, the server comprising one or more processors and memory storing instructions executable by the one or more processors. The server is operable to receive, from a mobile device of a user that is engaged in or desires to engage in an electronic transaction with an entity other than the user, first information that identifies the user and second information that directly or indirectly identifies the electronic transaction, wherein the second information does not contain payment information for the user, use the first information to identify the user, determine user payment information for the identified user, use the second information to identify a target for the payment information, and send the user payment information to the identified target for use to initiate the electronic transaction.

In one embodiment, the entity other than the user may comprise an ecommerce website, a point of sale (POS) terminal, a kiosk, an unattended terminal, an automatic teller machine (ATM), a print advertisement, a social media webpage, a product display, or an image of a good or service.

In one embodiment, the identified target may comprise a POS terminal, a merchant backend server, a merchant ecommerce server, or a payment server that is hosting a payment process that is associated with the electronic transaction.

In one embodiment, the second information includes at least one of: a session ID; a uniform resource identifier or network address of the server; information identifying the computing platform; information identifying a session owner; and information identifying the user. In one embodiment, the second information was received by the mobile device via visual transmission. In one embodiment, the second information was received by the mobile device as a QR code. In one embodiment, the QR code was provided by the entity other than the user. In one embodiment, the second information was received by the mobile device a graphic image containing the second information embedded as steganographic information. In one embodiment, the second information was received by the mobile device via audio transmission, wireless transmission, or manual entry. In one embodiment, the second information was received by the mobile device as a media file. In one embodiment, the server receives the first and second information via a session established with the mobile device.

In one embodiment, the server uses a payment preference of the user to determine payment information for the user. In one embodiment, the server received the payment preference of the user from the mobile device. In one embodiment, the server uses a shipping preference of the user to determine shipping instructions for the user. In one embodiment, the server received the shipping preference of the user from the mobile device. In one embodiment, prior to sending the user payment information to the identified target by the server, the server sends shipping instructions to the identified target, receives from the identified target a total payment amount for the transaction, including at least one of shipping fees and taxes levied, sends the total payment amount to the user, and receives authorization to complete the transaction from the user. In one embodiment, receiving authorization to complete the transaction includes authenticating the user of the mobile device. In one embodiment, authenticating the user includes receiving notification from the mobile device that the user was authenticated. In one embodiment, authenticating the user includes receiving information with which the mobile backend server authenticates the user. In one embodiment, the information for identifying or authenticating the identity of the user includes at least one of: a name of the user; an address of the user; an identification number associated with the user; biometric information provided by the user; a password, passcode, or personal information number (PIN) of the user; a digital signature of the user; a geo-location of the user; or information from the user's social network.

In one embodiment, sending the user payment information includes sending the information via a session established between the server and the identified target. In one embodiment, the user payment information comprises a token that represents payment information to be redeemed by the identified target to determine the payment information. In one embodiment, the payment information includes at least one of: information that identifies a financial institution; a name of the user; or information identifying the user's membership in a loyalty, rewards, or discount program.

In one embodiment, the electronic transaction comprises a "card present" transaction. In one embodiment, the electronic transaction comprises a payment transaction or a non-payment transaction. In one embodiment, the requested ecommerce transaction comprises at least one of: a payment or purchase; a credit transaction; a debit transaction; a deposit; a withdrawal; a money transfer; a transaction involving a loyalty program; a transaction involving a rewards program; a transaction involving a diet, health, or fitness program; a transaction involving coupons and offers; a transaction involving funds collection; a transaction involving utility payments; a transaction involving automatic payments or drafts; a transaction involving scheduled withdrawals; or a transaction involving recurring payments. In one embodiment, the first or second information is encoded such that one portion of the data cannot be modified or tampered with without causing another portion of the data to also be modified. In one embodiment, the second information includes a sequence counter to prevent replay attacks.

According to yet another aspect, the subject matter described herein includes a method for using a mobile device to effect a secure electronic transaction. In one embodiment, the method includes: at an ecommerce website, creating a payment process having a payment process identifier (PPID) and being associated with an electronic transaction requested by a user engaged in an ecommerce session with the ecommerce website via a computing platform separate from a mobile device of the user, and transmitting the PPID to the mobile device of the user. The mobile device receives the PPID and sends the PPID to a mobile backend server for storing and maintaining user payment information. The mobile backend server identifies the user, determines payment information for the identified user, and sends the user's payment information to the ecommerce website, to a merchant backend server, to a merchant ecommerce server, and/or to a payment network for use to complete the electronic transaction. In one embodiment, upon detection of an indication that the ecommerce user intends to perform an ecommerce transaction, the ecommerce website may identify the user via a website cookie or other means. In this scenario, the merchant may use the cookie to identify the user. If the user is associated with a mobile telephone number, the merchant may then transmit the PPID or other information to the device identified by the mobile telephone number. This information may be transmitted to the mobile device via SMS message, smart text message, or via the data network, e.g., as a data packet or application-to-application transfer.

In one embodiment, the user may be browsing an ecommerce website using a computing platform separate from the user's mobile device, such as a personal computer, and, at the time of initiating payment, use his or her mobile device to capture an image of the PPID. In another embodiment, the user may be browsing the ecommerce website using a mobile browser application on the mobile device, in which case, at the time of initiating payment, the PPID or other information may be transmitted from the mobile browser application to another mobile application that processes the PPID, etc., as described above. In yet another embodiment, the user may be browsing the ecommerce website using a custom mobile application which includes browser functions and also can capture the PPID or other information and process it within the same application, e.g., one service within the custom application (e.g., a browser or http/html rendering service) can send the information to another service within the custom application (e.g., an e-commerce or mobile payment service).

According to another aspect, the subject matter described herein includes a system for using a mobile device to effect a secure electronic transaction. In one embodiment, the system includes a mobile appliance software component of an ecommerce website that has engaged a user of the website in an ecommerce session via a computing platform separate from a mobile device of the user, and a mobile backend server separate from the ecommerce website. The mobile appliance software provides to the mobile device via the computing platform a payment process identifier (PPID) that identifies a payment process that is associated with an electronic transaction requested by the user during the ecommerce session. The mobile backend server receives the PPID from the mobile device, identifies the user, determines payment information for the identified user, and sends the user's payment information to the ecommerce website, to a merchant backend server, to a merchant ecommerce server, and/or to a payment network for use to complete the electronic transaction.

According to yet another aspect, the subject matter described herein includes a method for using a mobile device to effect a secure electronic transaction at a physical store. In one embodiment, the method includes: receiving, by a mobile device, a POS terminal ID that identifies a POS terminal or set of terminals associated with the physical store, and sending the POS terminal ID to a mobile backend server. The mobile backend server identifies the user, determines the user's payment information, and sends that payment information to the POS terminal identified by the POS terminal ID, to a merchant backend server associated with the POS terminal, and/or to a payment network for use to complete the transaction.

In one embodiment, the point of sale terminal of the merchant comprises a kiosk, an advertisement, an unattended terminal (e.g., an automatic teller machine or ATM, a gasoline dispenser at a gas station, etc.), an image of goods or services, etc., that presents or transmits the POSID to the mobile device. For example, an advertisement for a product may include a picture of the product along with a QR code which, when scanned by the user's mobile device, identifies a virtual POS terminal or other entity that operates to perform a transaction to purchase the advertised product, without the need for a physical cash register, cashier, or other aspects of a conventional POS terminal. In one embodiment, an image of the good or service can include the POS or virtual POS identifier embedded within the image in a manner that is not human-readable but that is detectable by a computer. For example, techniques used in steganography may be used to hide data within the image. In this example, the user may capture the image that contains the steganographically embedded data, and use stenographic techniques to extract the POS identifier. Other data may be similarly embedded with the image, including information identifying the good or service shown in the image, information identifying the merchant or vendor, and so on. Using the techniques described above, any image—QR code, bar code, text, picture, etc.,—can function as a virtual POS terminal, in that it can be used to initiate an electronic transaction. Such images could be displayed on webpages, on social networking sites, in print advertisements, on billboards, or on anything that a user could capture an image of.

In some embodiments of the methods and systems described herein, the information transmitted to the mobile device, such as the PPID or POS terminal ID, is encoded as a QR code that is displayed to the user via the computing platform. The information is transmitted to the mobile device when the user uses the mobile device to scan the QR code, which is decoded to get the PPID or POS terminal ID. In another embodiment, the information to be transmitted is displayed to the user as text, which the user manually enters into the mobile device or which the device can capture and subject to optical character recognition (OCR). In yet another embodiment, the information to be transmitted is transmitted electronically to the computing platform, which transmits the PPID or POS terminal ID to the mobile device via NFC, Bluetooth, Wi-Fi, Wi-Fi Direct, cellular, infrared (IR), or other wireless protocol. In yet another embodiment, the information to be transmitted is encoded as a sound file that is played by the computing platform. The information is transmitted to the mobile device when the user uses the mobile device to listen to the played sound file, which is decoded to get the PPID or POS terminal ID. The same methods described above may be used to transmit other information to the mobile device.

In some embodiments of the methods and systems described herein, before providing the payment information to the ecommerce website, POS terminal, or other merchant payment system the mobile backend server may provide shipping instructions to the merchant payment system, which are used to calculate the total purchase amount, including shipping and sales tax, if applicable. The total is reported back to the user via the mobile device, for the user's final approval, at which time the mobile device may authenticate the user via biometric data, user entry of password/ passcode, etc.

According to yet another aspect, the subject matter described herein includes a system for using a mobile device to effect a secure electronic transaction. The system includes a mobile appliance software component of an POS terminal of a merchant and a mobile backend server separate from the POS terminal. The mobile device receives a POS terminal identifier (POSID) that identifies the POS terminal and sends the POSID to the mobile backend server, and wherein the mobile backend server receives the POSID from the mobile device, identifies the user, determines payment information for the identified user, and sends the user's payment information to the point of sale terminal identified by the POSID, to a merchant backend server, to a merchant ecommerce server, and/or to a payment network for use to complete the electronic transaction.

According to another aspect, the subject matter described herein includes a method for using a mobile device to effect a secure electronic transaction. In one embodiment, a mobile backend server comprising one or more processors receives, from a mobile device of a user that is engaged in or desires to engage in an electronic transaction with an entity other than the user, first information that identifies the user and second information that identifies the entity. The mobile backend server uses the first information to identify the user and determines user payment information for the identified user. The mobile backend server uses the second information to identify the entity and sends the user payment information to the identified entity for use to initiate the electronic transaction. In one embodiment, the identified entity comprises a merchant backend server. In one embodiment, the identified entity comprises a merchant ecommerce server. In one embodiment, the identified entity comprises a payment server that is hosting the payment process. In one embodiment, the second information includes a session ID, a uniform resource identifier or network address of the mobile backend server, information identifying the computing platform, information identifying the session owner, and/or information identifying the user. In one embodiment, the second information was received by the mobile device via transmission by visual image, transmission by audio transmission, by wireless transmission, or by manual entry. In one embodiment, the mobile backend server receives the first and second information via a session established with the mobile device.

In one embodiment, the mobile backend server also receives from the mobile device a payment preference of the user, which the mobile backend server uses to determine payment information for the user.

In one embodiment, the mobile backend server also receives from the mobile device a shipping preference of the user, which the mobile backend server uses to determine shipping instructions for the user. In one embodiment, prior to sending the user payment information to the identified entity: the mobile backend server sends shipping instructions to the identified entity; the identified entity sends a total payment amount for the transaction, including at least one of shipping fees and taxes levied to the user; and the mobile backend server receives authorization from the user to complete the transaction. In one embodiment, receiving authorization to complete the transaction includes authenticating the user of the mobile device. In one embodiment, authenticating the user includes receiving, at the mobile device, identification information for identifying the user and authentication information for authenticating the identity of the user and using the authentication information to authenticate the identity of the user.

In one embodiment, the information for identifying or authenticating the identity of the user includes at least one of: a name of the user; an address of the user; an identification number associated with the user; biometric information provided by the user; a password, passcode, or personal information number (PIN) of the user; a digital signature of the user, a geo-location of the user, or information from the user's social network. In one embodiment, authentication of the identity of the user is performed by the mobile device. In one embodiment, the mobile backend server receives identification information and authentication information from the mobile device and uses the received information to authenticate the user. In one embodiment, the identification or authentication information is provided by the user or by entity different from the user. In one embodiment, the authorization to complete the transaction is received via the identified entity or via the mobile device.

In one embodiment, the mobile backend server sends the user payment information via a session established between the mobile backend server and the identified entity. In one embodiment, the user payment information comprises a token that represents payment information to be redeemed by the identified entity to determine the payment information. In one embodiment, the payment information includes information that identifies a financial institution. In one embodiment, the payment information includes a name of the user or information identifying the user's membership in a loyalty, rewards, or discount program. In one embodiment, the electronic transaction comprises a "card present" transaction. In one embodiment, the electronic transaction comprises a payment transaction or a non-payment transaction.

The subject matter described herein for effecting secure payment transactions using a mobile device may be implemented in hardware, software, firmware, or any combination thereof. As such, the terms "function" or "module" as used herein refer to hardware, software, and/or firmware for implementing the feature being described.

In one exemplary implementation, the subject matter described herein may be implemented using a computer readable medium having stored thereon executable instructions that when executed by the processor of a computer control the computer to perform steps. Exemplary computer readable media suitable for implementing the subject matter described herein include disk memory devices, chip memory devices, programmable logic devices, application specific integrated circuits, and other non-transitory storage media. In one implementation, the computer readable medium may include a memory accessible by a processor of a computer or other like device. The memory may include instructions executable by the processor for implementing any of the methods described herein. In addition, a computer readable medium that implements the subject matter described herein may be located on a single device or computing platform or may be distributed across multiple physical devices and/or computing platforms.

BRIEF DESCRIPTION OF THE DRAWINGS

Embodiments of the subject matter described herein will now be explained with reference to the accompanying drawings, wherein the like reference numerals represent like parts, of which.

DETAILED DESCRIPTION

Methods and systems for using a mobile device to effect a secure electronic transaction. The methods and systems described herein have several advantages over conventional payment methods using physical POS terminals or online e-commerce websites, such as:

- Enhanced security by taking advantages of additional capabilities provided by mobile devices, such as the ability to authenticate the customer more strongly by using or considering location or geo-coordinates, mobile phone identifiers, validation of customers account with mobile operators, validation of credit/debit card/DDA accounts issues to the customer by concerned financial institutions (e.g., banks), information from social networking sites, PINs, passcodes, digital signatures, and/or biometrics provided by the user, the mobile device, or other source.
- Enhanced security as a result of avoiding the transmittal of sensitive information between user and POS or between user and website, by instead using a secure mobile channel to backend servers and/or by moving sensitive information to the backend servers, which provide sensitive information to the ecommerce site so that the phone doesn't have to.

Offering low-cost "card-present" transaction fees for online transactions, which are otherwise treated as "card-not-present" transactions that have higher transaction costs. This feature is attractive to merchants as well as to consumers.

Embodiments of the subject matter will now be described.

Figure 1A:
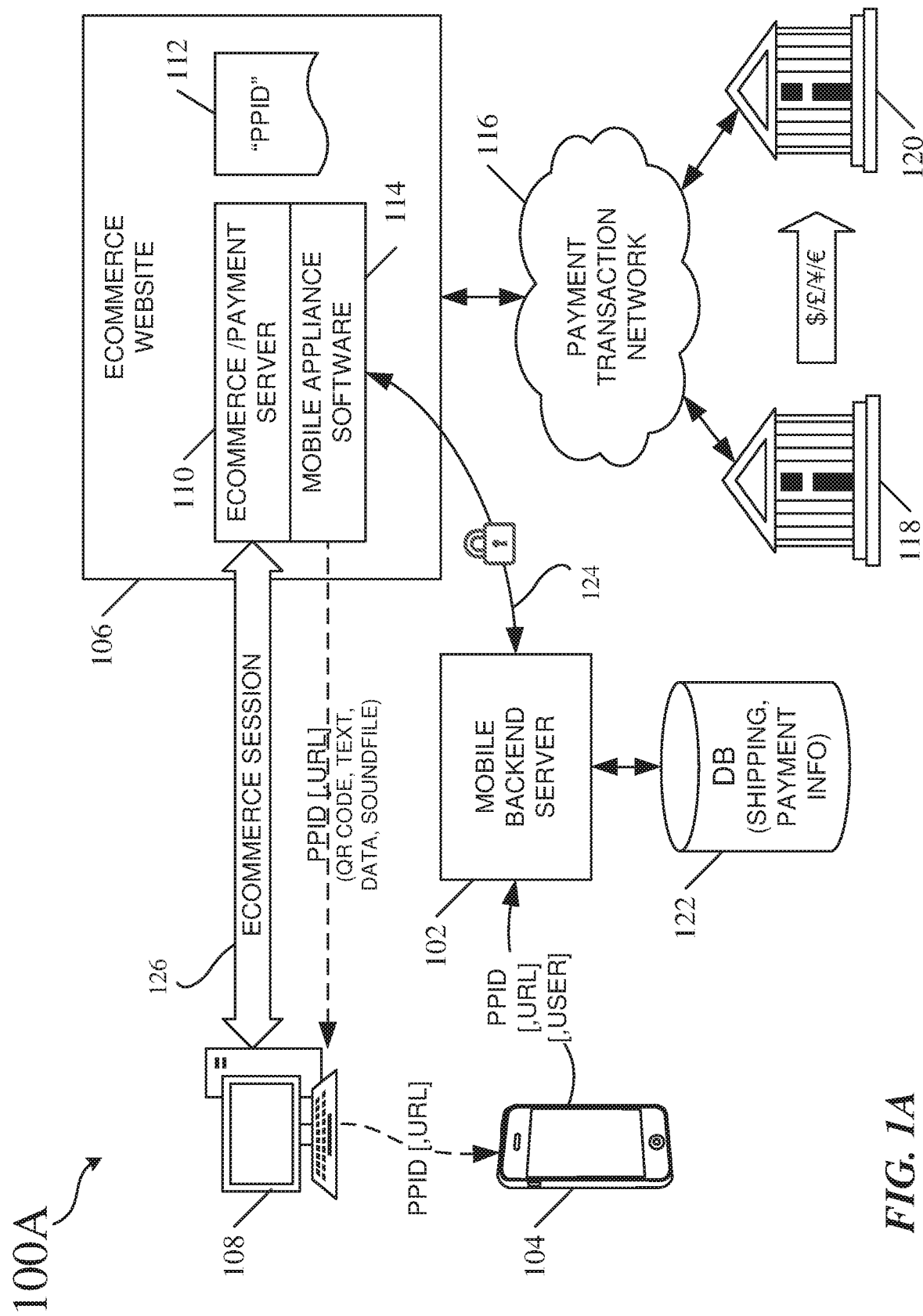
FIG. 1A is a block diagram illustrating an exemplary system for effecting secure electronic transactions using a mobile device according to an embodiment of the subject matter described herein.

FIG. 1A is a block diagram illustrating an exemplary system for effecting secure electronic transactions using a mobile device according to an embodiment of the subject matter described herein. FIG. 1A illustrates the scenario in which a mobile device is used to effect a payment for an ecommerce session that the mobile device is not initially involved with, but with which the mobile device is later engaged for the purpose of effecting a secure payment.

In the embodiment illustrated in FIG. 1A, system 100A includes a mobile backend server 102 that provides a means by which a mobile device 104 can effect a secure electronic transaction, such as electronic payment for goods purchased from an ecommerce website 106 by a user browsing the website via a computing platform 108 that is separate from mobile device 104. Examples of a computing platform 108 include, but are not limited to, a personal computer, a laptop, a tablet computer, a personal digital assistant (PDA), a smartphone separate from mobile device 104, and so on, but for simplicity of description computer platform 108 will be referred to herein as "PC 108".

Ecommerce websites typically include an ecommerce server for managing the user's shopping experience, such as keeping track of items that have been put into an online "shopping cart," or list of items to be purchased, and a payment server for handing the payment transaction. These two servers are represented in FIG. 1A as an ecommerce/payment server 110. When an ecommerce payment is requested, ecommerce/payment server 110 typically creates a payment process 112, which has a unique identifier referred to herein as a payment process ID, or "PPID."

In the embodiment illustrated in FIG. 1A, ecommerce website 106 includes an additional module, mobile appliance software 114, which interacts with mobile backend server 102 to enable mobile device 104 to effect the secure electronic transaction. Using information provided by mobile device 104, mobile backend server 102 communicates information needed by ecommerce payment server 110 via mobile appliance software 112. Ecommerce/payment server 110 then uses that information to send a payment transaction request to a payment transaction network 116, resulting in a transfer for funds from the user's bank 118 to the merchant's bank 120.

Unlike conventional POS systems, where sensitive information is communicated between the POS terminal and the backend server, the methods and systems described herein are designed so that sensitive information is not communicated between ecommerce website 106 and computing platform 108, between computing platform 108 and mobile device 104, or between mobile device 104 and mobile backend server 102. On the contrary, sensitive information is securely maintained within a database 122 that maps a user to his or her account information, and transmitted only over a secure channel 124 connecting mobile backend server 102 and mobile appliance software 114 within ecommerce website 106.

Examples of account information include, but are not limited to, a primary account number, a name of the account holder, information identifying a financial institution such as a card issuer, or other information needed for electronic transactions of any type. Account information is not limited to payment accounts but may also refer to non-payment accounts, including, but not limited to, loyalty or rewards accounts, travel miles accounts, health and fitness accounts, and so on. In addition to account information, database 122 may also include shipping information, including, but not limited to, a shipping address, a billing address, and shipping preferences, e.g., a preferred carrier, a shipping priority, and so on, which may also be transmitted from mobile backend server 102 to mobile appliance software 114. It will be understood that database 122 may include one or more separate databases, which may be co-located or may be geographically diverse from each other. For example, one database may be used to store sensitive information, such as payment information, while another database may be used to store less sensitive information, such as shipping addresses, or public information. Other combinations or configurations are within the scope of the subject matter described herein. For brevity of description, however, database 122 may be referred to in the singular.

Although a detailed example of a transaction will be described below starting with FIG. 2A, a simplified example will now be presented. Referring to the embodiment illustrated in FIG. 1A, a user is using a web browser on PC 108 to engage in an ecommerce session 126 (e.g., online shopping) with ecommerce website 106. To complete the transaction, the user clicks on a "pay now" button. Ecommerce website 106 creates a payment process 112, which is identified by its payment process ID, "PPID." Mobile appliance software 114 sends the PPID (and, optionally, the URL of ecommerce/payment server 110) to PC 108, which passes that information to mobile device 104. As will be described in more detail below, the information may be passed from PC 108 to mobile device 104 in a variety of formats, including, but not limited to, as a QR code, as a bar code, as scanned or transmitted text, or even as a media file, such as a sound file.

To complete the payment, mobile device 104 connects to mobile backend server 102 and sends the PPID, which mobile backend server 102 can use to identify the payment process associated with the user's ecommerce session, as well as information to identify the user and also whatever payment preference the user provides, such as "pay using credit card from Bank A", "pay using debit card from Bank B", etc.

In embodiments where mobile device 104 also transmits to mobile backend server 102 the URL of ecommerce/payment server 110, mobile backend server 102 may use the received URL to locate the particular payment server that is handling that particular payment process. In alternative embodiments, mobile backend server 102 may have been previously contacted by the particular payment server.

In one embodiment, mobile device 104 may also send to mobile backend server 102 information that identifies the user. In an alternative embodiment, mobile backend server 102 may determine the identity of the user based on information received when mobile device 104 attempts to transmit the information to mobile backend server 102. Examples of such information include, but are not limited to, a number that identifies mobile device 104, such as an IMSI or IMEI number, a number that identifies a connection to mobile device 104, such as an IP address, or other information that may be available to mobile backend server 102 as a result of communication from mobile device 104.

Mobile backend server 102 then uses the identity of the user, as well as a payment preference, if provided by the user, to look up sensitive information needed for the requested electronic transaction. In the embodiment illustrated in FIG. 1A, mobile backend server 102 may use the user ID as part of a query into database 122. Examples of information that may be returned as a result of such a query include, but are not limited to, primary account numbers, passwords, passcodes, and PINs associated with the accounts, information identifying the financial institution that issued a debit or credit card that is associated with the identified account, and so on.

The sensitive information is transmitted via mobile appliance software 114 to ecommerce/payment server 110, which initiates or otherwise handles the electronic transaction. In one embodiment, mobile backend server 102 may provide shipping information to ecommerce/payment server 110, which calculates sales tax and shipping costs, calculates the total, and sends the total to the user for confirmation before initiating the transaction.

Figure 1B:
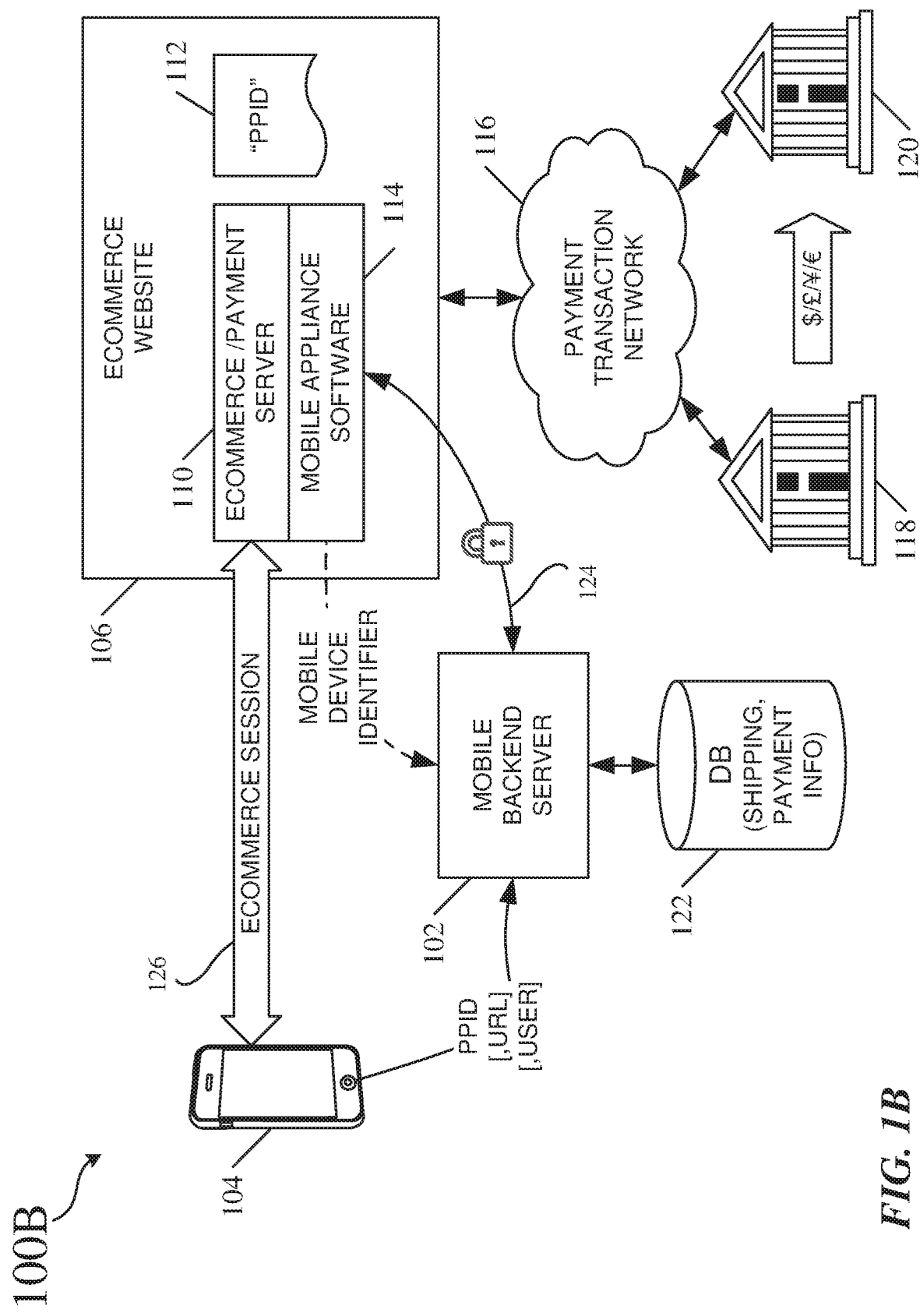
FIG. 1B is a block diagram illustrating an exemplary system for effecting secure electronic transactions using a mobile device according to another embodiment of the subject matter described herein.

FIG. 1B is a block diagram illustrating an exemplary system for effecting secure electronic transactions using a mobile device according to another embodiment of the subject matter described herein. FIG. 1B illustrates a scenario where a user is using his or her mobile device to engage in an ecommerce transaction with an ecommerce website.

In the embodiment illustrated in FIG. 1B, system 100B includes a mobile backend server 102 that provides a means by which a mobile device 104 can effect a secure electronic transaction, such as electronic payment for goods purchased from an ecommerce website 106 by a user browsing the website mobile device 104. Ecommerce/payment server 110, payment process 112, mobile appliance software 114, payment transaction network 116, user's bank 118, merchant's bank 120, database 122, and secure channel 126 are essentially identical to their like-numbered counterparts in FIG. 1A, and so their descriptions will not be repeated here.

In the embodiment illustrated in FIG. 1B, a user is using a web browser or other app on mobile device 104 to engage in an ecommerce session 126 (e.g., online shopping) with ecommerce website 106. To complete the transaction, the user clicks on a "pay now" button. Ecommerce website 106 creates a payment process 112, which is identified by its payment process ID, "PPID." Mobile appliance software 114 then identifies the mobile device that is engaged in ecommerce session 126, e.g., using a number that identifies mobile device 104, such as an IMSI or IMEI number, a number that identifies a connection to mobile device 104, such as an IP address, or other information that may be available to mobile backend server 102 as a result of communication from mobile device 104. Mobile appliance software 114 then sends the information that identifies mobile device 104 to mobile backend server 102.

Mobile backend server 102 receives the mobile device identifier and uses it to look up the identity of a user. In one embodiment, database 122 may store an association between mobile device ID and user ID. Mobile backend server 102 then uses the identity of the user, as well as a payment preference, if provided by the user, to look up sensitive information needed for the requested electronic transaction. The sensitive information is then transmitted via secure channel 124 to ecommerce/payment server 110, which initiates or otherwise handles the electronic transaction. In one embodiment, mobile backend server 102 may provide shipping information to ecommerce/payment server 110, which calculates sales tax and shipping costs, calculates the total, and sends the total to the user for confirmation before initiating the transaction.

Figure 1C:
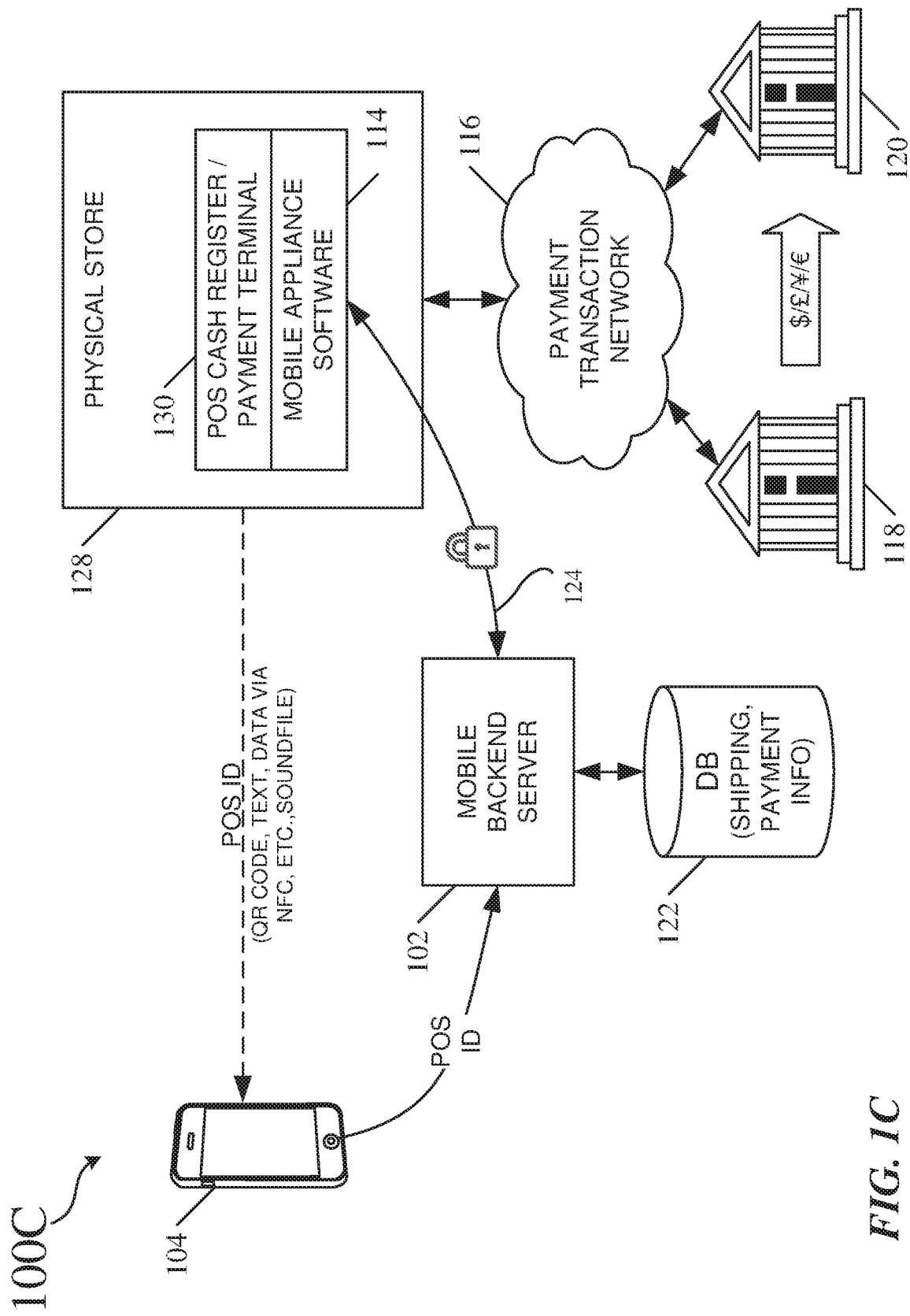
FIG. 1C is a block diagram illustrating an exemplary system for effecting secure electronic transactions using a mobile device according to yet another embodiment of the subject matter described herein.

FIG. 1C is a block diagram illustrating an exemplary system for effecting secure electronic transactions using a mobile device according to another embodiment of the subject matter described herein. FIG. 1C illustrates a scenario where a user is using his or her mobile device to effect payment for an in-store purchase.

In the embodiment illustrated in FIG. 1C, system 100C includes a mobile backend server 102 that provides a means by which a mobile device 104 can effect a secure electronic transaction, such as electronic payment for goods purchased at a physical store 128 via a point of sale (POS) cash register/payment terminal 130. Mobile appliance software 114, payment transaction network 116, user's bank 118, merchant's bank 120, database 122, and secure channel 126 are essentially identical to their like-numbered counterparts in FIG. 1A, and so their descriptions will not be repeated here.

In the embodiment illustrated in FIG. 1C, a user at POS cash register/payment terminal 130 (which, for brevity is will hereinafter be referred to simply as "payment terminal 130) who desires to initiate payment using mobile device 104 uses mobile device 104 to receive information that uniquely identifies payment terminal 130. In the embodiment illustrated in FIG. 1B, this information is referred to as the point of sale terminal identifier, or "POS ID." The POS ID may be a static value that is assigned to a particular POS terminal and never changed, or it may be a dynamic value that changes periodically, changes daily, changes per transaction, etc.

Mobile device 104 may receive this information in a variety of ways. For example, payment terminal 130 may display the POS ID in a machine-readable form, such as a QR code, a bar code, or alphanumeric text that can be scanned and machine-read by mobile device 104. The POS ID could be displayed to the consumer via a display monitor, for example. If the POS ID is static, payment terminal 130 could display the POS ID on a sticker that faces the customer. In another embodiment, the POS ID could be transmitted to mobile device 104 wirelessly, such as via NFC, Bluetooth, Wi-Fi, or Wi-Fi Direct, via some other radio frequency communications protocol, via infrared (IR), and so on. In yet another embodiment, the POS ID could be encoded in a sound file or other media file, which is heard, seen, and/or recorded by mobile device 104 and processed (e.g., decoded) to retrieve the encoded POS ID. In one embodiment, the POS ID may include unique number, such as a sequence counter output, to prevent a replay attack, e.g., to ensure that the POS ID cannot be used twice.

Mobile device 104 then sends the POS ID to mobile backend server 102. In one embodiment, the user starts a mobile app hosted by mobile device 104, uses it to receive the POS ID (in whichever form it was sent), and then establishes a session, communication channel, or other connection to mobile backend server 102 for the purpose of sending the POS ID to mobile backend server 102.

Mobile backend server 102 determines an identity of the user, determines a payment preference or payment instrument, and uses that information to look up the user's payment information, which is sent to mobile appliance software 114 via secure channel 124. Payment terminal 130 then initiates a payment transaction with payment transaction network 116 in a manner similar to that described above with regards to FIG. 1A. As in FIG. 1A, mobile backend server 102 may send shipping information to payment terminal 130 prior to sending the payment information, so that payment terminal 130 may calculate a total amount and present it to the user, via mobile device 104, for the user to review and approve. Likewise, mobile device 104 may authenticate the user prior to sending the payment information to payment terminal 130, e.g., by using biometrics, by requesting entry of a password or passcode, or by any of the user authentication methods previously described above.

In one embodiment, the point of sale terminal of the merchant comprises a kiosk, an unattended terminal (e.g., an automatic teller machine or ATM), an advertisement, an image of goods or services, etc., that presents or transmits the POSID to the mobile device. For example, an advertisement for a product may include a picture of the product along with a QR code which, when scanned by the user's mobile device, identifies a virtual POS terminal or other entity that operates to perform a transaction to purchase the advertised product, without the need for a physical cash register, cashier, or other aspects of a conventional POS terminal. In one embodiment, an image of the good or service can include the POS or virtual POS identifier embedded within the image in a manner that is not human-readable but that is detectable by a computer. For example, techniques used in steganography may be used to hide data within the image. In this example, the user may capture the image that contains the steganographically embedded data, and use stenographic techniques to extract the POS identifier. Other data may be similarly embedded with the image, including information identifying the good or service shown in the image, information identifying the merchant or vendor, and so on. Using the techniques described above, any image—QR code, bar code, text, picture, etc.,—can function as a virtual POS terminal, in that it can be used to initiate an electronic transaction. Such images could be displayed on webpages, on social networking sites, in print advertisements, on billboards, or on anything that a user could capture an image of FIGS. 2A, 2B, 2C, 2D, 3, and 4 are signal messaging diagrams illustrating messages communicated among components of an exemplary system for using a mobile device to effect a secure electronic transaction according to an embodiment of the subject matter described herein.

In the embodiment illustrated in FIG. 2A through FIG. 4, the electronic transaction is an ecommerce (payment) transaction, but the same principles apply to non-payment transactions as well. In alternative embodiments, the transaction could be a loyalty or rewards program transaction, for example, but for the sake of illustration of the concepts described herein, a payment scenario is described. Likewise, examples involving an ecommerce website are shown, but the same principles apply to transactions with any type of entity and are not limited to transactions with an ecommerce website. The methods and systems described herein may be applied to any electronic transaction where it is desirable to avoid transmission of sensitive data over a network as well as other forms of potential exposure to unauthorized entities.

Figure 2A:
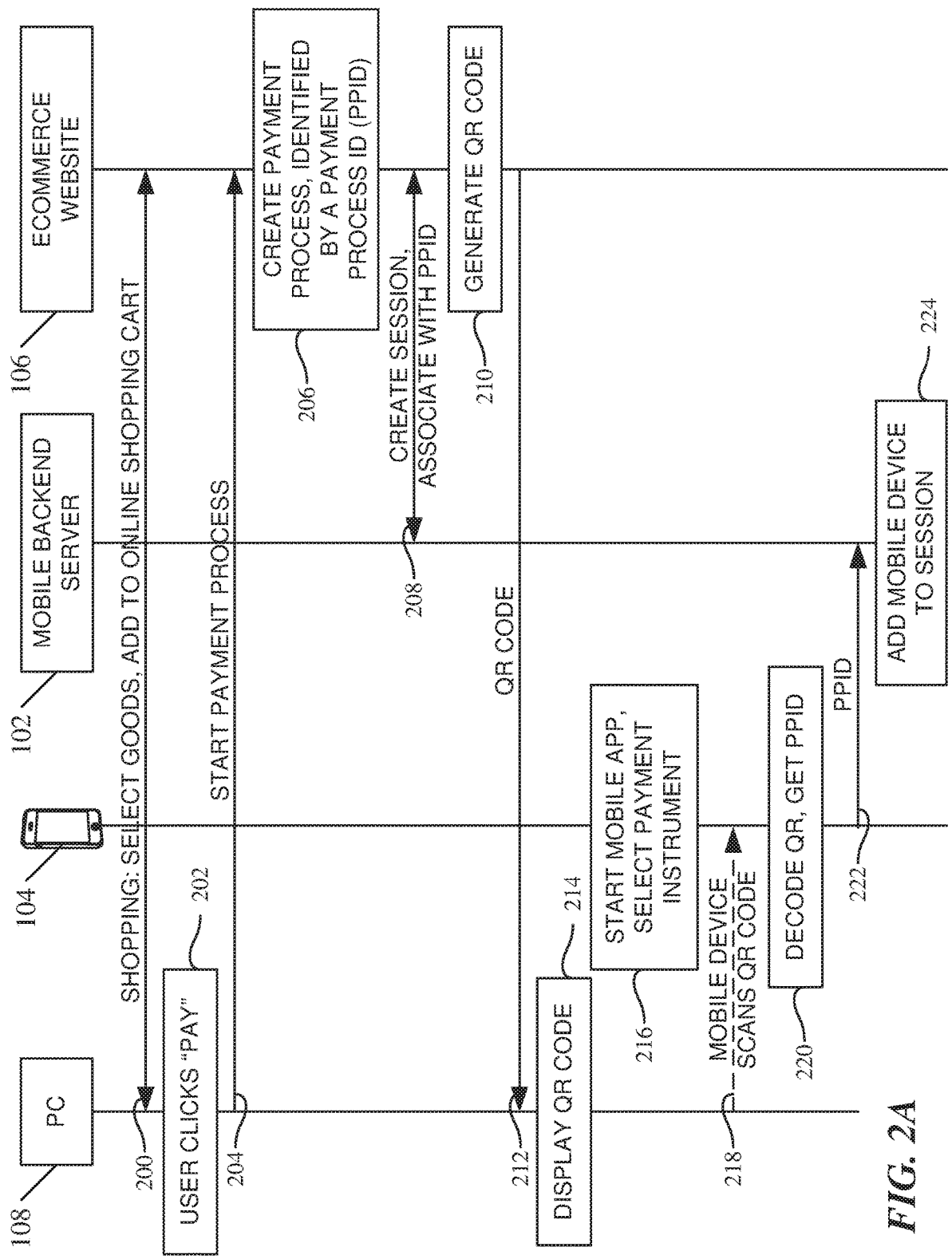
FIGS. 2A, 2B, 2C, 2D, 3, 4, and 5 are signal messaging diagrams illustrating messages communicated among components of an exemplary system for using a mobile device to effect a secure electronic transaction according to embodiments of the subject matter described herein.
Figure 2B:
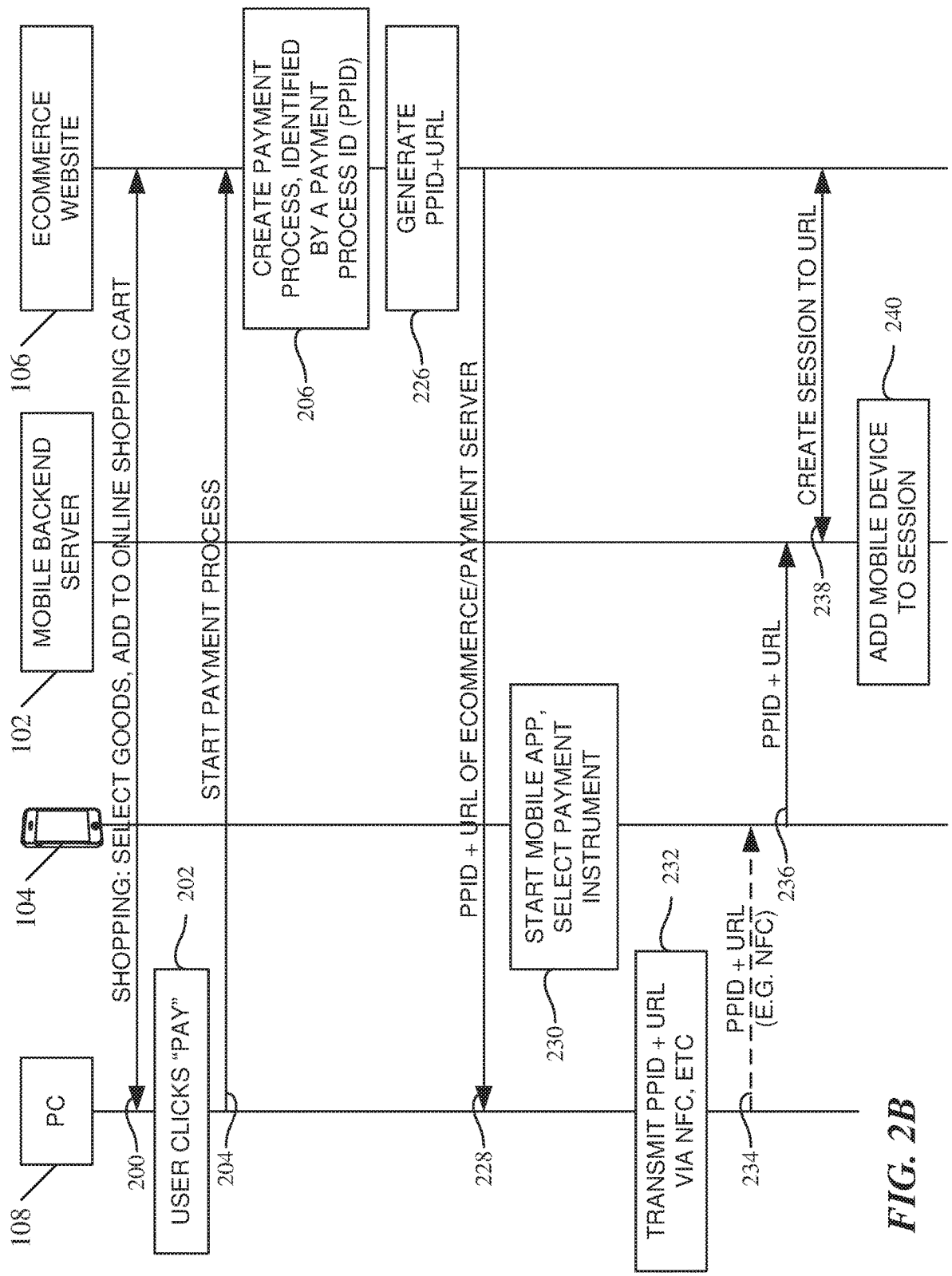
Figure 2C:
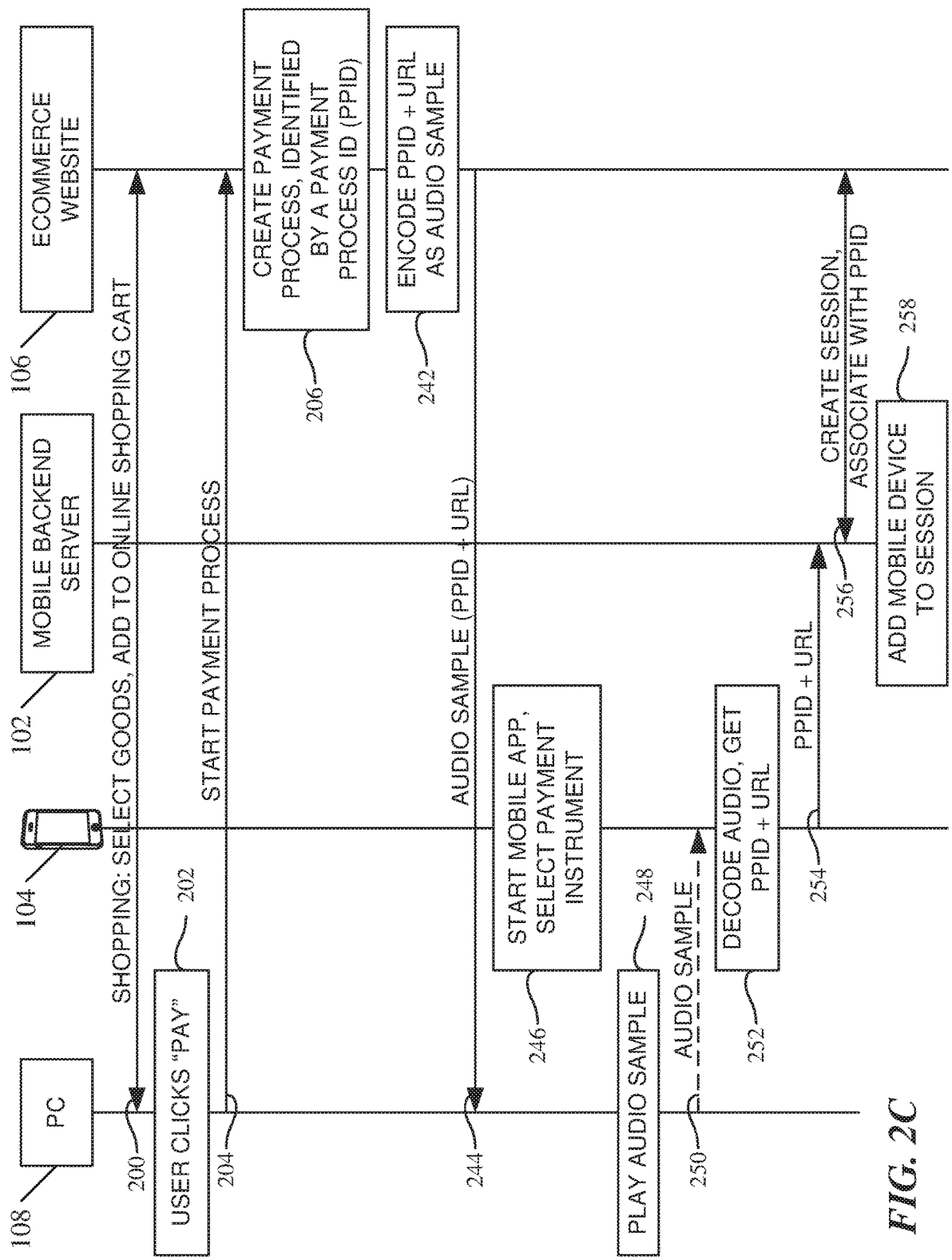

FIGS. 2A, 2B, and 2C illustrate a first portion of an exemplary transaction according to different embodiments of the subject matter described herein. In each of FIGS. 2A, 2B, and 2C, a user is using a personal computer or other computing platform 108 separate from mobile device 104 to browse an ecommerce site that is serviced by ecommerce/payment server 110. The user uses PC 108 to shop online, e.g., selecting goods to be purchased, adding them to an online "shopping cart," and so on. This activity between PC 108 and the ecommerce website 106 (or, more specifically, between PC 108 and ecommerce/payment server 110), is represented by bidirectional traffic 200.

When the user is ready to make a purchase, the user typically does so by clicking on a "PAY" button on the ecommerce website (block 202), which notifies ecommerce website 106 that the user wants to start the payment process (message 204.) In one embodiment, the ecommerce website presents the user with a choice of payment methods, in which case message 204 also informs ecommerce website 106 which payment type is desired by the user. In response, ecommerce website 106 creates a payment process (block 206). In one embodiment, the payment process may be identified by a payment process identifier, or PPID. In the embodiments illustrated in FIGS. 2A, 2B, and 2C, the user has selected a payment type that uses mobile backend server 102, and so ecommerce website 106 establishes a session with mobile backend server 102 (traffic 208), and associates the session with the payment process identified by PPID.

In order to involve or engage the user's mobile device for the purpose of effecting the payment in a secure manner, ecommerce website 106 then generates information that the mobile device can use to engage itself with the payment process created in block 206. This information can take a variety of forms, including both human-readable and machine-readable formats. FIGS. 2A, 2B, and 2C illustrate three different example approaches that could be taken.

In the embodiment illustrated in FIG. 2A, ecommerce website 106 generates a QR code (block 210) and sends the QR code to the PC 108 (message 212), which displays the QR code on the computer screen (block 214). The QR code contains information that mobile device 104 can use to identify a particular payment process. In one embodiment, the user then starts a mobile app and selects a payment instrument (block 216), then uses mobile device 104 to scan the QR code from the ecommerce website (arrow 218), which is then decoded to get the PPID or other information that identifies the payment process (step 220). Mobile device 104 then sends the decoded PPID to mobile backend server 102 (message 222), and in response, at block 224, mobile backend server 102 adds mobile device 104 to the existing session that was previously created by traffic 208. In alternative embodiments, ecommerce web site 106 could generate a barcode, text, picture, video, or other type of visual code that mobile device 104 could scan and decode. In an alternative embodiment, the QR code could be generated by mobile backend server 102 based on PPID or other information provided to it by ecommerce website 106 and provided to ecommerce website 106, which displays the visual code to the user. The process continues in FIG. 3.

In the embodiment illustrated in FIG. 2B, elements 200, 202, 204, and 206 are essentially identical in nature and intent to their like-numbered counterparts in FIG. 2A, and therefore their descriptions will not be repeated here. After creating the payment process (block 206), ecommerce website 106 generates the PPID and URL information (block 226), but does not encode it into a QR code but rather transmits it to PC 108 (message 228) without first encoding it visually. Once the user receives an indication that the information is available, the user starts the mobile application on selects the payment instrument (block 230). In block 232, PC 108 transmits the PPID and URL of ecommerce website 106 to mobile device 104 wirelessly (transmission 234), e.g., via NFC, Bluetooth, Wi-Fi, Wi-Fi Direct, etc. Mobile device 104 then forwards the information to mobile backend server 102 (message 236). In this embodiment, mobile backend server 102 initiates the session with ecommerce website 106 (indicated by bidirectional arrow 238), then adds mobile device 104 to the session so created (block 240.) The process continues in FIG. 3.

In the embodiment illustrated in FIG. 2C, elements 200, 202, 204, and 206 are essentially identical in nature and intent to their like-numbered counterparts in FIG. 2A, and therefore their descriptions will not be repeated here. After creating the payment process (block 206), ecommerce website 106 encodes the PPID and URL information as an audio sample (although other media samples are also contemplated) at block 242, and transmits it to PC 108 (transmission 244) as an audio sample. The user starts the mobile application and selects the payment instrument (block 246). PC 108 then plays the audio sample (block 248), which is heard by mobile device 102 (transmission 250). Mobile device 102 then decodes the audio sample (block 252) to retrieve the PPID and optional URL stored within. The PPID and other information is then sent from mobile device 104 to mobile backend server 102 (message 254), which uses this information to create a session with ecommerce website 106 (indicated by bidirectional arrow 256) and adds mobile device 104 to the session (block 258.) The process continues in FIG. 3.

Figure 2D:
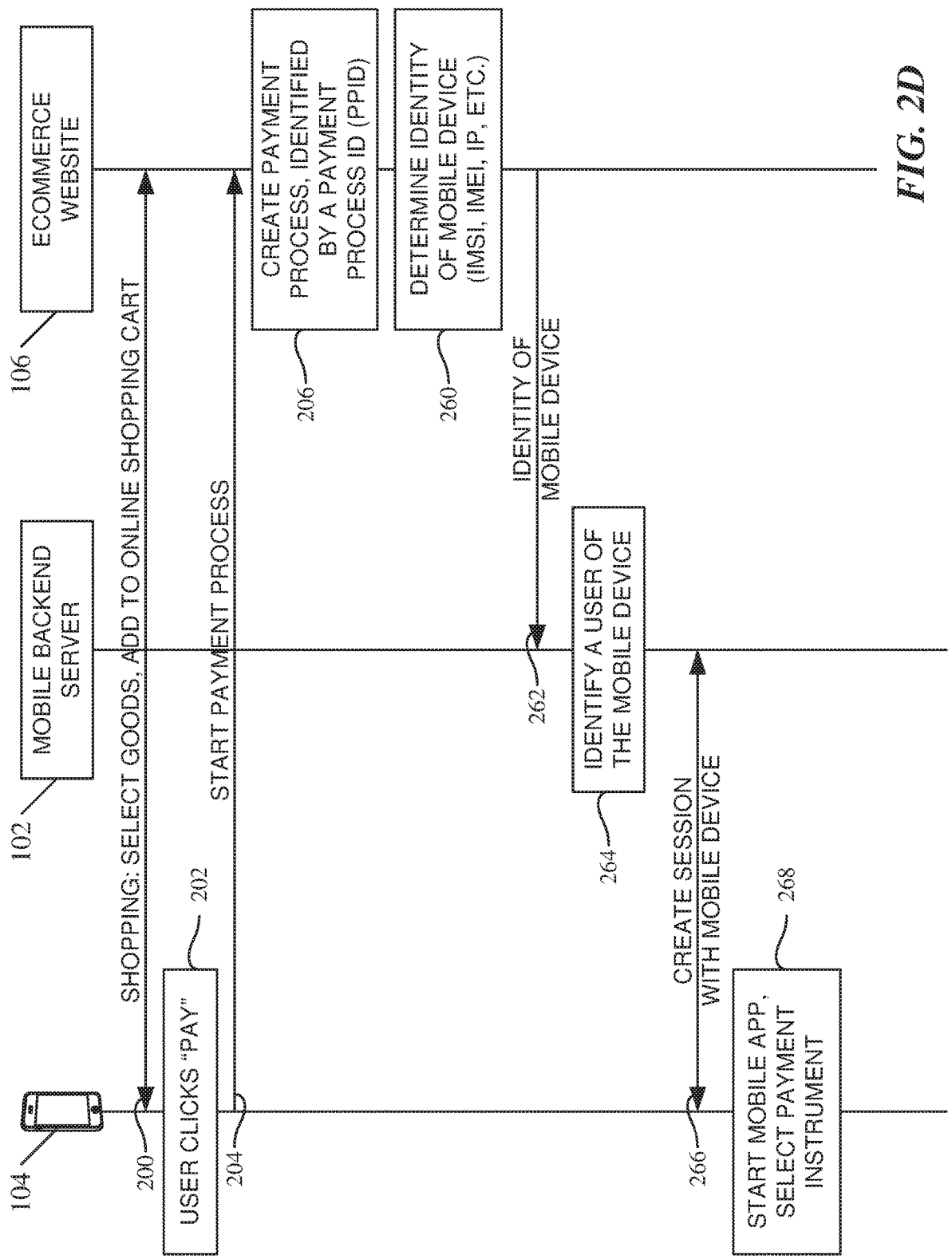

FIG. 2D illustrates a first portion of an exemplary transaction according to another embodiment of the subject matter described herein. FIG. 2D is a signal messaging diagram illustrating messages communicated among components of an exemplary system in the scenario where the user is using his or her mobile phone, rather than a separate computing platform, to browse the ecommerce website and engage in an ecommerce session.

In the embodiment illustrated in FIG. 2D, a user is using mobile device 104 to do the online shopping or other online transactions (arrow 200). The user takes some action to initiate the desired electronic transaction, such as clicking "PAY" to initiate an ecommerce payment process, etc. (block 202), and in response, mobile device 104 sends to ecommerce website 106 an instruction, notification, or other message to that effect (message 204). Where the desired transaction is an ecommerce payment, for example, ecommerce/payment server creates a payment process identified by a payment process ID "PPID" (block 206).

In the embodiment illustrated in FIG. 2D, ecommerce website 106 then determines the identity of the mobile device that is part of the ecommerce session 200. Mobile device 104 may be identified by its international mobile subscriber identity (IMSI) number, its international mobile equipment identity (IMEI) number, or other information about mobile device 104 or ecommerce session 200 that is available to ecommerce website 106. Ecommerce website 106 then sends to mobile backend server 102 this information identifying the mobile device (message 262).

In the embodiment illustrated in FIG. 2D, mobile backend server 102 then uses the identity of mobile device 104 to identify a user of that mobile device (block 264) and create a session or other connection with mobile device 104 (arrow 266). On mobile device 104, a mobile app is started (either by the user or by mobile backend server 102), and the user selects a payment instrument (block 268). The process continues in FIG. 3.

In one embodiment, upon detection of an indication that the ecommerce user intends to perform an ecommerce transaction, the ecommerce website may identify the user via a website cookie or other means. In this scenario, the merchant may use the cookie to identify the user. If the user is associated with a mobile telephone number, the merchant may then transmit the PPID or other information to the device identified by the mobile telephone number. This information may be transmitted to the mobile device via SMS message, smart text message, or via the data network, e.g., as a data packet or application-to-application transfer.

In one embodiment, the user may be browsing an ecommerce website using a computing platform separate from the user's mobile device, such as a personal computer, and, at the time of initiating payment, use his or her mobile device to capture an image of the PPID. In another embodiment, the user may be browsing the ecommerce website using a mobile browser application on the mobile device, in which case, at the time of initiating payment, the PPID or other information may be transmitted from the mobile browser application to another mobile application that processes the PPID, etc., as described above. In yet another embodiment, the user may be browsing the ecommerce website using a custom mobile application which includes browser functions and also can capture the PPID or other information and process it within the same application, e.g., one service within the custom application (e.g., a browser or http/html rendering service) can send the information to another service within the custom application (e.g., an e-commerce or mobile payment service).

Figure 3:
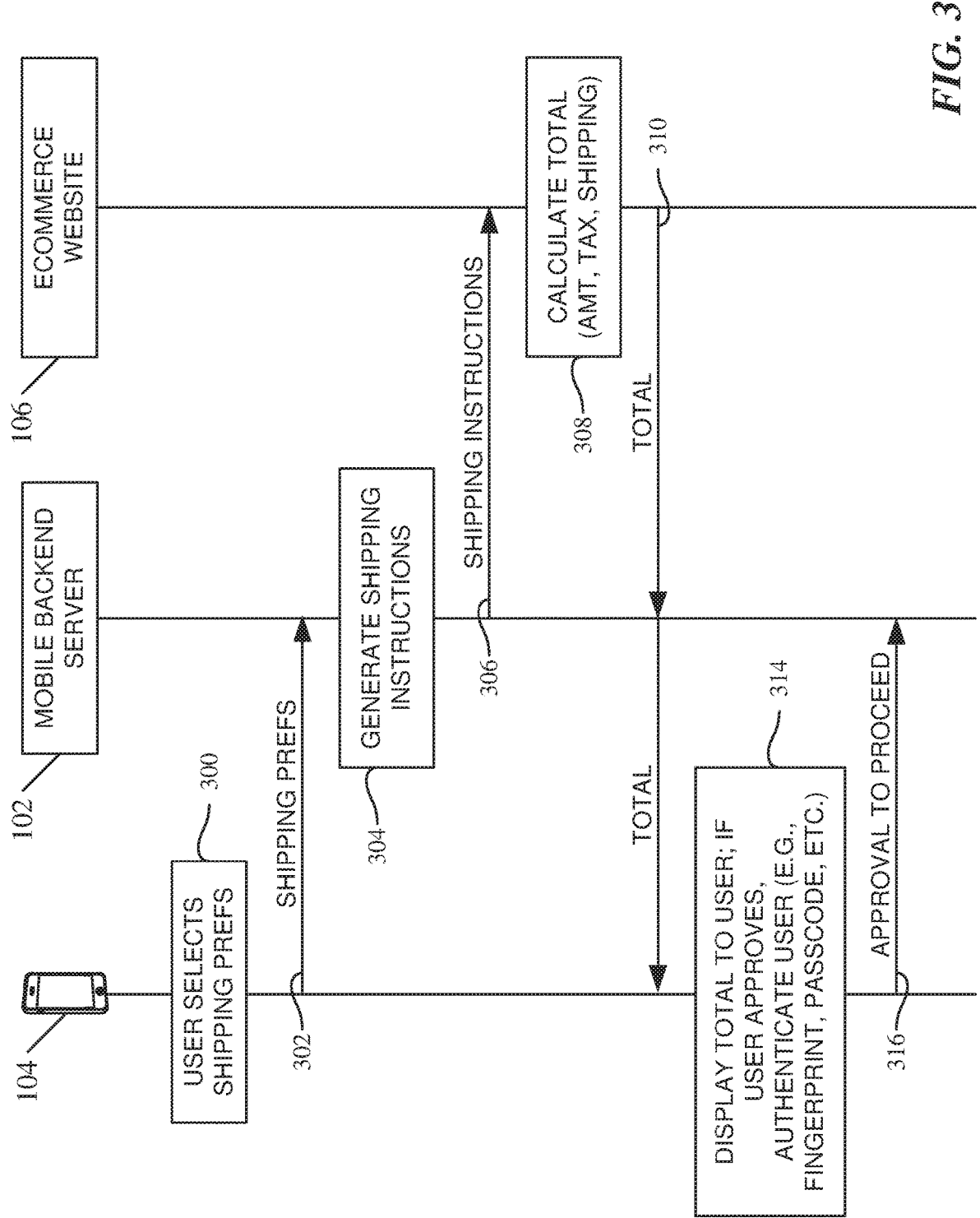

FIG. 3 illustrates a second portion of an exemplary transaction according to an embodiment of the subject matter described herein. In the embodiment illustrated in FIG. 3, the process continues with block 300, in which the user selects shipping preferences, which may include, but is not limited to, indicating a shipping address, indicating a preferred carrier, and indicating a preferred priority type, such as first class, second class, ground, etc. These shipping preferences are reported to mobile backend server 102 (message 302), which uses them to generate shipping instructions (block 304), which are sent to ecommerce website 106 (message 306). In one embodiment, generating shipping instructions may include, but is not limited to, generating a specific shipping address and indicating preferred carrier, priority type, etc.

At block 308, ecommerce website 106 uses the shipping instructions to calculate the total purchase amount, e.g., including tax and shipping, and sends that total to the user for review (message 310). In the example illustrated in FIG. 3, the user decides at block 312 whether to complete or cancel the transaction. In one embodiment, to complete the transaction, the user must be authenticated before approval to proceed can be given.

In the embodiment illustrated in FIG. 3, the capabilities of mobile device 104 are brought to bear for the purpose of authenticating the user in block 314. If authenticated, the mobile device communicates approval to proceed with the transaction (message 316.) The authentication step can occur, before, after, or while the user indicates approval. For example, mobile device 104 may require the user to enter a password, passcode, or PIN before or after the user indicates approval. Mobile devices having a fingerprint sensor may require the user to touch the sensor as a means to indicate approval of the purchase, during which time the mobile device can authorize the user based on verification of the user's fingerprint.

Figure 4:
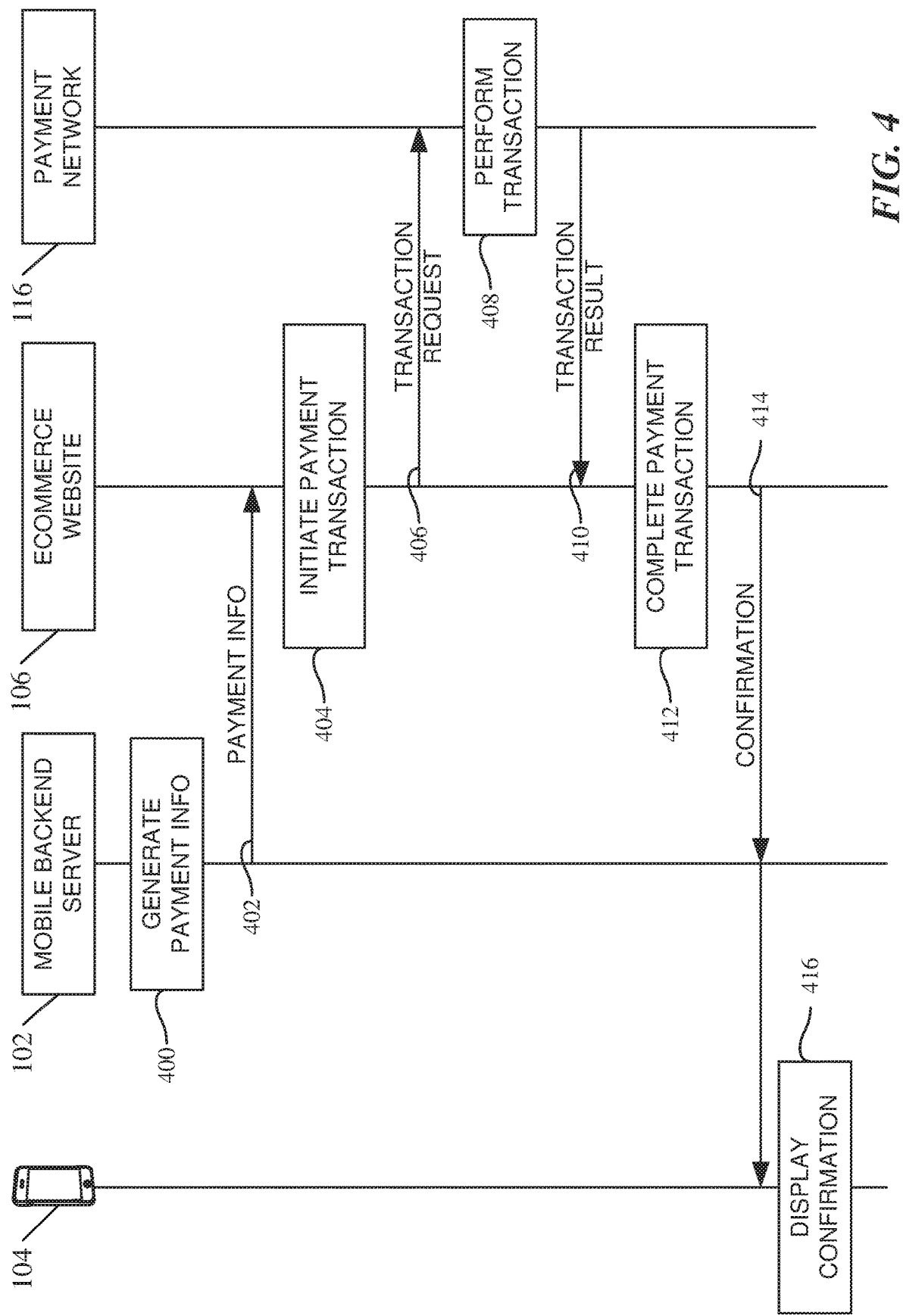

FIG. 4 illustrates a third portion of an exemplary transaction according to an embodiment of the subject matter described herein. In the embodiment illustrated in FIG. 4, the process continues with block 400, in which mobile backend server 102 generates payment information and sends that payment information to ecommerce website 106 (message 402).

In one embodiment, payment information 402 includes sensitive information such as a primary account number, the card-holder's name, address, etc. In this embodiment, the transaction is as secure as a transaction performed at a conventional POS terminal.

In another embodiment, rather than sending sensitive information, payment information 402 may include a token that represents a payment transaction. In this embodiment, ecommerce website 106 or payment network 116 would "detokenize" the token to identify the sensitive information.

In yet another embodiment, rather than sending sensitive information directly, payment information 402 may include a pointer or index that ecommerce website 106 or payment network 116 could use to look up the sensitive information, e.g., in a private or shared database.

In the embodiment illustrated in FIG. 4, ecommerce website 106 uses the payment information received in message 402 to build initiate a payment transaction (block 404). Ecommerce website 106 sends a transaction request 406 to payment network 116, which performs the transaction (block 408), and reports the transaction result to ecommerce/payment server 104 (message 410). In the scenario where the transaction was successful, ecommerce website 106 marks the transaction as complete (block 412), e.g., removing successfully purchased items from the online shopping cart, etc., and sends a confirmation of the purchase to mobile device 104 (message 414). Mobile device 104 displays the confirmation (or failure) to the user (block 416).

Figure 5:
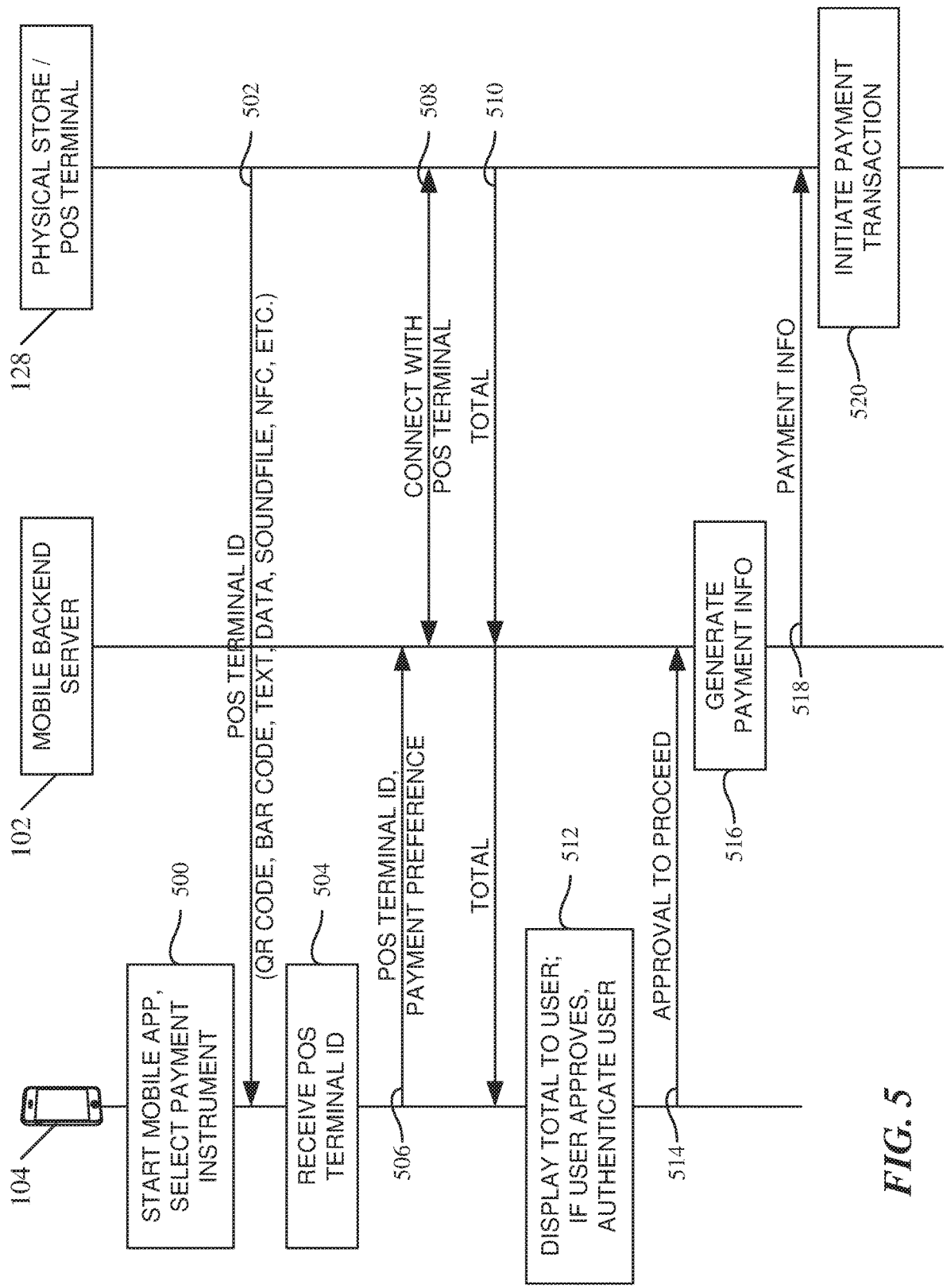

FIG. 5 is a signal messaging diagram illustrating messages communicated among components of an exemplary system for using a mobile device to effect a secure electronic transaction according to an embodiment of the subject matter described herein. In the embodiment illustrated in FIG. 5, a mobile device 104 is being used to effect payment for a purchase made at a physical store, e.g., via a POS terminal 128.

To effect payment, the user uses a mobile application. The user starts or brings to the foreground the mobile application (block 500). If multiple payment instruments are supported, the user may optionally select a payment instrument. The user uses the mobile application to receive, from POS terminal 128 or from a printed material or from a contactless RFID or NFC tag near a POS terminal, information that identifies the POS terminal, such as a POS terminal ID (message 502) through a camera scan of a QR code or barcode, NFC, Wi-Fi, Wi-Fi direct, Bluetooth, infrared, or other wireless communication. Mobile device 104 receives the POS terminal ID (block 504) and sends it to mobile backend server 102 (message 506). If multiple payment instruments are supported, mobile device 104 may also send a payment preference to mobile backend server 102.

In the embodiment illustrated in FIG. 5, mobile backend server 102 connects with the POS terminal identified by the POS terminal ID (arrow 508). POS terminal 128 then calculates a total for the transaction, which it sends to mobile device 104 directly or via mobile backend server 102 (message 510).

In the embodiment illustrated in FIG. 5, mobile device 104 displays the total to the user for approval. If the user approves, mobile device 104 authenticates the user, e.g., via biometrics, user entry of passcode/password, etc. (block 512). If authentication is successful, mobile device 104 notifies mobile backend server 102 that the user has given approval to proceed (message 514).

Upon receipt of approval to proceed, mobile backend server 102 generates payment information (block 516) and transmits it to POS terminal 128 (message 518), which uses the payment information to initiate a payment transaction with a payment network (block 520). Although not shown in FIG. 5, in one embodiment, POS terminal 128 may report the results of the attempted payment transaction back to mobile device 104 directly or via mobile backend server 102.

In one embodiment, mobile backend server 102 uses the authenticated user identity (and payment preference, if that has been provided) to look up the user's payment information that is then sent to POS terminal 128. In another embodiment, mobile backend server 102 may determine the user's identity based on information that it received in an earlier message, such as in message 506, and pre-lookup the payment information that is ultimately send in message 518.

The POS terminal ID may be conveyed to mobile device 104 in a variety of ways. In one embodiment, the POS terminal ID may be displayed to the user as via a QR code or bar code and scanned by mobile device 104. The POS terminal ID may be dynamically generated and presented to the user via a terminal display. The POS terminal ID may be static, e.g., it may be assigned to the terminal and not changed or changed rarely, in which case the QR code or bar code may be printed on a sticker that is affixed to the terminal on a side facing the customer or may be transmitted by a contactless RFID or NFC tag on or near the terminal. The POS terminal ID may be conveyed using any of the methods described above to convey a PPID, e.g., via a wireless transmission from POS terminal 128 to mobile device 104, via a sound file played by POS terminal 128 and detected or recorded by mobile device 104, as alphanumeric text presented to the user, who types the value into mobile device 104, and so on.

According to another aspect, the subject matter described herein includes a method for using a mobile device to effect a secure electronic transaction. In one embodiment, a mobile backend server comprising one or more processors receives, from a mobile device of a user that is engaged in or desires to engage in an electronic transaction with an entity other than the user, first information that identifies the user and second information that identifies the entity. The mobile backend server uses the first information to identify the user and determines user payment information for the identified user. The mobile backend server uses the second information to identify the entity and sends the user payment information to the identified entity for use to initiate the electronic transaction. In one embodiment, the identified entity comprises a merchant backend server. In one embodiment, the identified entity comprises a merchant ecommerce server. In one embodiment, the identified entity comprises a payment server that is hosting the payment process. In one embodiment, the second information includes a session ID, a uniform resource identifier or network address of the mobile backend server, information identifying the computing platform, information identifying the session owner, and/or information identifying the user. In one embodiment, the second information was received by the mobile device via transmission by visual image, transmission by audio transmission, by wireless transmission, or by manual entry. In one embodiment, the mobile backend server receives the first and second information via a session established with the mobile device.

In one embodiment, the mobile backend server also receives from the mobile device a payment preference of the user, which the mobile backend server uses to determine payment information for the user.

In one embodiment, the mobile backend server also receives from the mobile device a shipping preference of the user, which the mobile backend server uses to determine shipping instructions for the user. In one embodiment, prior to sending the user payment information to the identified entity: the mobile backend server sends shipping instructions to the identified entity; the identified entity sends a total payment amount for the transaction, including at least one of shipping fees and taxes levied to the user; and the mobile backend server receives authorization from the user to complete the transaction. In one embodiment, receiving authorization to complete the transaction includes authenticating the user of the mobile device. In one embodiment, authenticating the user includes receiving, at the mobile device, identification information for identifying the user and authentication information for authenticating the identity of the user and using the authentication information to authenticate the identity of the user.

In one embodiment, the information for identifying or authenticating the identity of the user includes at least one of: a name of the user; an address of the user; an identification number associated with the user; biometric information provided by the user; a password, passcode, or personal information number (PIN) of the user; a digital signature of the user, a geo-location of the user, or information from the user's social network. In one embodiment, authentication of the identity of the user is performed by the mobile device. In one embodiment, the mobile backend server receives identification information and authentication information from the mobile device and uses the received information to authenticate the user. In one embodiment, the identification or authentication information is provided by the user or by entity different from the user. In one embodiment, the authorization to complete the transaction is received via the identified entity or via the mobile device.

In one embodiment, the mobile backend server sends the user payment information via a session established between the mobile backend server and the identified entity. In one embodiment, the user payment information comprises a token that represents payment information to be redeemed by the identified entity to determine the payment information. In one embodiment, the payment information includes information that identifies a financial institution. In one embodiment, the payment information includes a name of the user or information identifying the user's membership in a loyalty, rewards, or discount program. In one embodiment, the electronic transaction comprises a "card present" transaction. In one embodiment, the electronic transaction comprises a payment transaction or a non-payment transaction.

It is important to note that the order of the actions and messages shown in the embodiments illustrated in FIGS. 1A through 5 are for illustration only and are not intended to be limiting. Furthermore, embodiments having additional steps or fewer steps are also within the scope of the subject matter described herein.

EMBODIMENTS

Embodiment 1

A method for using a mobile device to effect a secure electronic transaction, the method comprising: at an ecommerce website, creating a payment process having a payment process identifier (PPID) and being associated with an electronic transaction requested by a user engaged in an ecommerce session with the ecommerce website via a computing platform of the user separate from a mobile device of the user, and transmitting the PPID to the mobile device of the user; at the mobile device, receiving the PPID and sending the PPID to a mobile backend server for storing and maintaining user payment information; and at the mobile backend server, identifying the user, determining payment information for the identified user, and sending the user's payment information to the ecommerce website for use to complete the electronic transaction.

Embodiment 2

The method of embodiment 1 wherein the PPID includes information identifying a payment server that is hosting the payment process and wherein the mobile backend server sends the user's payment information to the identified payment server.

Embodiment 3

The method of embodiment 1 wherein the PPID includes at least one of: a session ID; a uniform resource identifier or network address of the mobile backend server; information identifying the computing platform; information identifying the session owner; and information identifying the user.

Embodiment 4

The method of embodiment 1 wherein transmitting the PPID to the mobile device includes generating a QR code or barcode that includes the PPID, transmitting the QR code or barcode to the computing platform, and presenting the QR code or barcode to the user via a display of the computing platform, wherein the user uses the mobile device to scan the displayed QR code or barcode and decode the scanned QR code or barcode to extract the PPID.

Embodiment 5

The method of embodiment 1 wherein transmitting the PPID to the mobile device includes sending the PPID electronically to the computing platform, which transmits the PPID via wired or wireless communication to the mobile device.

Embodiment 6

The method of embodiment 5 wherein transmitting the PPID via wireless communication includes communication using near field communication (NFC), Bluetooth, Wi-Fi, Wi-Fi Direct, or cellular communication.

Embodiment 7

The method of embodiment 1 wherein transmitting the PPID to the mobile device includes encoding the PPID into a media file and sending the media file to the computing platform, which plays the media file, wherein the mobile device records or detects the media file and decodes it to extract the PPID.

Embodiment 8

The method of embodiment 1 wherein the ecommerce website creates the payment process in response to receiving from the user via the ecommerce session a request to start the payment process.

Embodiment 9

The method of embodiment 8 wherein the request to start the payment process includes a payment preference of the user and wherein the mobile backend server is identified by the ecommerce website based on the payment preference.

Embodiment 10

The method of embodiment 1 wherein the mobile device communicates with the mobile backend server via a session established between the mobile device and the mobile backend server.

Embodiment 11

The method of embodiment 1 wherein the mobile backend server identifies the user based on information received from the mobile device.

Embodiment 12

The method of embodiment 1 wherein the mobile backend server also receives from the mobile device a payment preference of the user, which the mobile backend server uses to determine payment information for the user.

Embodiment 13

The method of embodiment 1 wherein the mobile backend server also receives from the mobile device a shipping preference of the user, which the mobile backend server uses to determine shipping instructions for the user.

Embodiment 14

The method of embodiment 13 comprising, prior to sending the user's payment information to the ecommerce website: sending, by the mobile backend server, shipping instructions to the ecommerce website; sending, by the ecommerce website to the user, a total payment amount for the transaction, including at least one of shipping fees and taxes levied; and receiving, from the user, authorization to complete the transaction.

Embodiment 15

The method of embodiment 14 wherein receiving authorization to complete the transaction includes authenticating the user of the mobile device.

Embodiment 16

The method of embodiment 15 wherein authenticating the user includes receiving, at the mobile device, identification information for identifying the user and authentication information for authenticating the identity of the user and using the authentication information to authenticate the identity of the user.

Embodiment 17

The method of embodiment 16 wherein the information for identifying or authenticating the identity of the user includes at least one of: a name of the user; an address of the user; an identification number associated with the user; biometric information provided by the user; a password, passcode, or personal information number (PIN) of the user; a digital signature of the user, a geo-location of the user, or information from the user's social network.

Embodiment 18

The method of embodiment 16 wherein authentication of the identity of the user is performed by the mobile device.

Embodiment 19

The method of embodiment 16 comprising, at the backend mobile server, receiving from the mobile device identification information and authentication information and using the received information to authenticate the user.

Embodiment 20

The method of embodiment 16 wherein the identification or authentication information is provided by the user or by entity different from the user.

Embodiment 21

The method of embodiment 14 wherein sending the total payment amount to the user includes sending the total amount via the ecommerce session to the computing platform, which displays the total amount to the user.

Embodiment 22

The method of embodiment 14 wherein sending the total payment amount to the user includes sending the total amount via the mobile backend server to the mobile device of the user, which displays the total amount to the user.

Embodiment 23

The method of embodiment 14 wherein the authorization to complete the transaction is received via the computing platform or via the mobile device.

Embodiment 24

The method of embodiment 1 wherein sending the user's payment information includes sending the information via a session established between the mobile backend server and the ecommerce website, the session being associated with the electronic transaction that was requested by the user.

Embodiment 25

The method of embodiment 1 wherein the computing platform comprises a personal computer, a tablet, a smart phone, a personal digital assistant, or a mobile computing device.

Embodiment 26

The method of embodiment 1 wherein the payment information communicated between the mobile device and the mobile backend server is encoded such that one portion of the data cannot be modified or tampered with without causing another portion of the data to also be modified.

Embodiment 27

The method of embodiment 26 wherein encoding the payment information communicated between the mobile device and the mobile backend server includes providing the payment information as an in input into at least one of an encryption function, a mathematical function, or a mapping function, the output of which is communicated.

Embodiment 28

The method of embodiment 1 wherein the payment information comprises a token that represents payment information and wherein the ecommerce website redeems the token to determine the payment information.

Embodiment 29

The method of embodiment 1 wherein the payment information includes information that identifies a financial institution.

Embodiment 30

The method of embodiment 1 wherein the payment information includes a name of the user or information identifying the user's membership in a loyalty, rewards, or discount program.

Embodiment 31

The method of embodiment 1 wherein the requested electronic transaction comprises a "card present" transaction.

Embodiment 32

The method of embodiment 1 wherein the requested electronic transaction comprises a payment transaction or a non-payment transaction.

Embodiment 33

The method of embodiment 32 wherein the requested ecommerce transaction comprises at least one of: a payment or purchase; a credit transaction; a debit transaction; a deposit; a withdrawal; a money transfer; a transaction involving a loyalty program; a transaction involving a rewards program; and a transaction involving a diet, health, or fitness program.

Embodiment 34

A system for using a mobile device to effect a secure electronic transaction, the system comprising: a mobile appliance software component of an ecommerce website that has engaged a user of the website in an ecommerce session via a computing platform of the user separate from a mobile device of the user; and a mobile backend server separate from the ecommerce website, wherein the mobile appliance software provides to the mobile device via the computing platform a payment process identifier (PPID) that identifies a payment process that is associated with an electronic transaction requested by the user during the ecommerce session, and wherein the mobile backend server receives the PPID from the mobile device, identifies the user, determines payment information for the identified user, and sends the user's payment information to the ecommerce website for use to complete the electronic transaction.

Embodiment 35

The system of embodiment 34 wherein the PPID includes information identifying a payment server that is hosting the payment process and wherein the mobile backend server sends the user's payment information to the identified payment server.

Embodiment 36

The system of embodiment 34 wherein the PPID includes at least one of: a session ID; a uniform resource identifier or network address of the mobile backend server; information identifying the computing platform; information identifying the session owner; and information identifying the user.

Embodiment 37

The system of embodiment 34 wherein the mobile appliance software encodes the PPID into a QR code or bar code that is presented to the user via a display of the computing platform and that is scanned by the mobile device and decoded to extract the PPID.

Embodiment 38

The system of embodiment 34 wherein the mobile appliance software sends the PPID electronically to the computing platform, which transmits the PPID to the mobile device via wired or wireless communication to the mobile device.

Embodiment 39

The system of embodiment 38 wherein transmitting the PPID via wireless communication includes communication using near field communication (NFC), Bluetooth, Wi-Fi, Wi-Fi Direct, or cellular communication.

Embodiment 40

The system of embodiment 34 wherein the mobile appliance software encodes the PPID into a media file that is sent to the computing platform, which plays the media file, and wherein the mobile device records or detects the media file, which it decodes to extract the PPID.

Embodiment 41

The system of embodiment 34 wherein the ecommerce website creates the payment process in response to receiving from the user via the ecommerce session a request to start the payment process.

Embodiment 42

The system of embodiment 41 wherein the request to start the payment process includes a payment preference of the user and wherein the mobile backend server is identified by the ecommerce website based on the payment preference.

Embodiment 43

The system of embodiment 34 wherein the mobile device communicates with the mobile backend server via a session established between the mobile device and the mobile backend server.

Embodiment 44

The system of embodiment 34 wherein the mobile backend server identifies the user based on information received from the mobile device.

Embodiment 45

The system of embodiment 34 wherein the mobile backend server also receives from the mobile device a payment preference of the user, which the mobile backend server uses to determine payment information for the user.

Embodiment 46

The system of embodiment 34 wherein the mobile backend server also receives from the mobile device a shipping preference of the user, which the mobile backend server uses to determine shipping instructions for the user.

Embodiment 47

The system of embodiment 46 comprising, prior to sending the user's payment information to the ecommerce website: optionally sending, by the mobile backend server, shipping instructions to the ecommerce website; sending, by the ecommerce website to the user, a total payment amount for the transaction, including at least one of shipping fees and taxes levied; and receiving, from the user, authorization to complete the transaction.

Embodiment 48

The system of embodiment 47 wherein receiving authorization to complete the transaction includes authenticating the user of the mobile device.

Embodiment 49

The system of embodiment 48 wherein authenticating the user includes receiving, at the mobile device, identification information for identifying the user and authentication information for authenticating the identity of the user and using the authentication information to authenticate the identity of the user.

Embodiment 50

The system of embodiment 49 wherein the information for identifying or authenticating the identity of the user includes at least one of: a name of the user; an address of the user; an identification number associated with the user; biometric information provided by the user; a password, passcode, or personal information number (PIN) of the user; a digital signature of the user, a geo-location of the user, or information from the user's social network.

Embodiment 51

The system of embodiment 49 wherein authentication of the identity of the user is performed by the mobile device.

Embodiment 52

The system of embodiment 49 comprising, at the backend mobile server, receiving from the mobile device identification information and authentication information and using the received information to authenticate the user.

Embodiment 53

The system of embodiment 49 wherein the identification or authentication information is provided by the user or by entity different from the user.

Embodiment 54

The system of embodiment 47 wherein sending the total payment amount to the user includes sending the total amount via the ecommerce session to the computing platform, which displays the total amount to the user.

Embodiment 55

The system of embodiment 47 wherein sending the total payment amount to the user includes sending the total amount via the mobile backend server to the mobile device of the user, which displays the total amount to the user.

Embodiment 56

The system of embodiment 47 wherein the authorization to complete the transaction is received via the computing platform or via the mobile device.

Embodiment 57

The system of embodiment 34 wherein sending the user's payment information includes sending the information via a session established between the mobile backend server and the ecommerce website, the session being associated with the electronic transaction that was requested by the user.

Embodiment 58

The system of embodiment 34 wherein the computing platform comprises a personal computer, a tablet, a smart phone, a personal digital assistant, or a mobile computing device.

Embodiment 59

The system of embodiment 34 wherein the payment information communicated between the mobile device and the mobile backend server is encoded such that one portion of the data cannot be modified or tampered with without causing another portion of the data to also be modified.

Embodiment 60

The system of embodiment 59 wherein encoding the payment information communicated between the mobile device and the mobile backend server includes providing the payment information as an in input into at least one of an encryption function, a mathematical function, or a mapping function, the output of which is communicated.

Embodiment 61

The system of embodiment 34 wherein the payment information comprises a token that represents payment information and wherein the ecommerce website redeems the token to determine the payment information.

Embodiment 62

The system of embodiment 34 wherein the payment information includes information that identifies a financial institution.

Embodiment 63

The system of embodiment 34 wherein the payment information includes a name of the user or information identifying the user's membership in a loyalty, rewards, or discount program.

Embodiment 64

The system of embodiment 34 wherein the requested electronic transaction comprises a "card present" transaction.

Embodiment 65

The system of embodiment 34 wherein the requested electronic transaction comprises a payment transaction or a non-payment transaction.

Embodiment 66

The system of embodiment 65 wherein the requested ecommerce transaction comprises at least one of: a payment or purchase; a credit transaction; a debit transaction; a deposit; a withdrawal; a money transfer; a transaction involving a loyalty program; a transaction involving a rewards program; and a transaction involving a diet, health, or fitness program.

Embodiment 67

A non-transitory computer readable medium having stored thereon executable instructions that when executed by the processor of a computer control the computer to perform steps comprising: at an ecommerce website, creating a payment process having a payment process identifier (PPID) and being associated with an electronic transaction requested by a user engaged in an ecommerce session with the ecommerce website via a computing platform of the user separate from a mobile device of the user, and transmitting the PPID to the mobile device of the user; at the mobile device, receiving the PPID and sending the PPID to a mobile backend server for storing and maintaining user payment information; at the mobile backend server, identifying the user, determining payment information for the identified user, and sending the user's payment information to the ecommerce website for use to complete the electronic transaction.

Embodiment 68

A method for using a mobile device to effect a secure electronic transaction, the method comprising: at a mobile device, receiving a point of sale terminal identifier (POSID) that identifies a point of sale terminal of a merchant, and sending the POSID to a mobile backend server for storing and maintaining user payment information; and at the mobile backend server, identifying the user, determining payment information for the identified user, and sending the user's payment information to the point of sale terminal identified by the POSID for use to complete the transaction.

Embodiment 69

The method of embodiment 68 wherein the point of sale terminal of the merchant comprises an electronic cash register, a kiosk, an unattended terminal, an automatic teller machine (ATM), an advertisement, or an image of goods or services, that presents or transmits the POSID to the mobile device.

Embodiment 70

The method of embodiment 68 wherein receiving the POSID by the mobile device includes scanning, by the mobile device, a QR code or barcode that includes the POSID.

Embodiment 71

The method of embodiment 68 wherein receiving the POSID by the mobile device includes receiving the POSID via wired or wireless communication.

Embodiment 72

The method of embodiment 71 wherein the wireless communication includes communication using near field communication (NFC), Bluetooth, Wi-Fi, Wi-Fi Direct, or cellular communication.

Embodiment 73

The method of embodiment 68 wherein receiving the POSID by the mobile device includes receiving the POSID encoded into a media file, which the mobile device records or detects and decodes to extract the POSID.

Embodiment 74

The method of embodiment 68 wherein receiving the POSID by the mobile device includes providing the POSID to the user, who manually enters the POSID into the mobile device.

Embodiment 75

The method of embodiment 68 wherein the mobile device sends a payment preference of the user to the mobile backend server for use to determine the user's payment information.

Embodiment 76

The method of embodiment 68 wherein the mobile device communicates with the mobile backend server via a session established between the mobile device and the mobile backend server.

Embodiment 77

The method of embodiment 68 wherein the mobile backend server identifies the user based on information received from the mobile device.

Embodiment 78

The method of embodiment 68 wherein the mobile backend server also receives from the mobile device a shipping preference of the user, which the mobile backend server uses to determine shipping instructions for the user.

Embodiment 79

The method of embodiment 78 comprising, prior to sending the user's payment information to the POS terminal: optionally sending, by the mobile backend server, shipping instructions to the POS terminal; sending, by the POS terminal to the user, a total payment amount for the transaction, including at least one of shipping fees and taxes levied; and receiving, from the user, authorization to complete the transaction.

Embodiment 80

The method of embodiment 79 wherein receiving authorization to complete the transaction includes authenticating the user of the mobile device.

Embodiment 81

The method of embodiment 80 wherein authenticating the user includes receiving, at the mobile device, identification information for identifying the user and authentication information for authenticating the identity of the user and using the authentication information to authenticate the identity of the user.

Embodiment 82

The method of embodiment 81 wherein the information for identifying or authenticating the identity of the user includes at least one of: a name of the user; an address of the user; an identification number associated with the user; biometric information provided by the user; a password, passcode, or personal information number (PIN) of the user; a digital signature of the user, a geo-location of the user, or information from the user's social network.

Embodiment 83

The method of embodiment 80 wherein authentication of the identity of the user is performed by the mobile device.

Embodiment 84

The method of embodiment 80 comprising, at the backend mobile server, receiving from the mobile device identification information and authentication information and using the received information to authenticate the user.

Embodiment 85

The method of embodiment 80 wherein the identification or authentication information is provided by the user or by entity different from the user.

Embodiment 86

The method of embodiment 79 wherein sending the total payment amount to the user includes sending the total amount via the ecommerce session to the computing platform, which displays the total amount to the user.

Embodiment 87

The method of embodiment 79 wherein sending the total payment amount to the user includes sending the total amount via the mobile backend server to the mobile device of the user, which displays the total amount to the user.

Embodiment 88

The method of embodiment 79 wherein the authorization to complete the transaction is received via the computing platform or via the mobile device.

Embodiment 89

The method of embodiment 68 wherein sending the user's payment information includes sending the information via a session established between the mobile backend server and the POS terminal, the session being associated with the electronic transaction that was requested by the user.

Embodiment 90

The method of embodiment 68 wherein the payment information communicated between the mobile device and the mobile backend server is encoded such that one portion of the data cannot be modified or tampered with without causing another portion of the data to also be modified.

Embodiment 91

The method of embodiment 90 wherein encoding the payment information communicated between the mobile device and the mobile backend server includes providing the payment information as an in input into at least one of an encryption function, a mathematical function, or a mapping function, the output of which is communicated.

Embodiment 92

The method of embodiment 68 wherein the payment information comprises a token that represents payment information and wherein the POS terminal redeems the token to determine the payment information.

Embodiment 93

The method of embodiment 68 wherein the payment information includes information that identifies a financial institution.

Embodiment 94

The method of embodiment 68 wherein the payment information includes a name of the user or information identifying the user's membership in a loyalty, rewards, or discount program.

Embodiment 95

The method of embodiment 68 wherein the requested electronic transaction comprises a "card present" transaction.

Embodiment 96

The method of embodiment 68 wherein the requested electronic transaction comprises a payment transaction or a non-payment transaction.

Embodiment 97

The method of embodiment 96 wherein the requested ecommerce transaction comprises at least one of: a payment or purchase; a credit transaction; a debit transaction; a deposit; a withdrawal; a money transfer; a transaction involving a loyalty program; a transaction involving a rewards program; and a transaction involving a diet, health, or fitness program.

Embodiment 98

A system for using a mobile device to effect a secure electronic transaction, the system comprising: a mobile appliance software component of an POS terminal of a merchant; and a mobile backend server separate from the POS terminal, wherein the mobile device receives a POS terminal identifier (POSID) that identifies the POS terminal and sends the POSID to the mobile backend server, and wherein the mobile backend server receives the POSID from the mobile device, identifies the user, determines payment information for the identified user, and sends the user's payment information to the point of sale terminal identified by the POSID for use to complete the electronic transaction.

Embodiment 99

The system of embodiment 98 wherein the mobile device receives the POSID by scanning a QR code or barcode that includes the POSID.

Embodiment 100

The system of embodiment 98 wherein the mobile device receives the POSID via wired or wireless communication.

Embodiment 101

The system of embodiment 100 wherein the wireless communication includes communication using near field communication (NFC), Bluetooth, Wi-Fi, Wi-Fi Direct, or cellular communication.

Embodiment 102

The system of embodiment 98 wherein the mobile device receives the POSID encoded as media file, which the mobile devices records or detects and decodes to extract the POSID.

Embodiment 103

The system of embodiment 98 wherein the mobile device receives the POSID from the user, who manually enters it into the mobile device.

Embodiment 104

The system of embodiment 98 wherein the mobile device sends a payment preference of the user to the mobile backend server for use to determine the user's payment information.

Embodiment 105

The system of embodiment 98 wherein the mobile device communicates with the mobile backend server via a session established between the mobile device and the mobile backend server.

Embodiment 106

The system of embodiment 98 wherein the mobile backend server identifies the user based on information received from the mobile device.

Embodiment 107

The system of embodiment 98 wherein the mobile backend server also receives from the mobile device a shipping preference of the user, which the mobile backend server uses to determine shipping instructions for the user.

Embodiment 108

The system of embodiment 107 comprising, prior to sending the user's payment information to the POS terminal: sending, by the mobile backend server, shipping instructions to the POS terminal; sending, by the POS terminal to the user, a total payment amount for the transaction, including at least one of shipping fees and taxes levied; and receiving, from the user, authorization to complete the transaction.

Embodiment 109

The system of embodiment 108 wherein receiving authorization to complete the transaction includes authenticating the user of the mobile device.

Embodiment 110

The system of embodiment 109 wherein authenticating the user includes receiving, at the mobile device, identification information for identifying the user and authentication information for authenticating the identity of the user and using the authentication information to authenticate the identity of the user.

Embodiment 111

The system of embodiment 110 wherein the information for identifying or authenticating the identity of the user includes at least one of: a name of the user; an address of the user; an identification number associated with the user; biometric information provided by the user; a password, passcode, or personal information number (PIN) of the user; a digital signature of the user, a geo-location of the user, or information from the user's social network.

Embodiment 112

The system of embodiment 109 wherein authentication of the identity of the user is performed by the mobile device.

Embodiment 113

The system of embodiment 109 comprising, at the backend mobile server, receiving from the mobile device identification information and authentication information and using the received information to authenticate the user.

Embodiment 114

The system of embodiment 109 wherein the identification or authentication information is provided by the user or by entity different from the user.

Embodiment 115

The system of embodiment 108 wherein sending the total payment amount to the user includes sending the total amount via the ecommerce session to the computing platform, which displays the total amount to the user.

Embodiment 116

The system of embodiment 108 wherein sending the total payment amount to the user includes sending the total amount via the mobile backend server to the mobile device of the user, which displays the total amount to the user.

Embodiment 117

The system of embodiment 108 wherein the authorization to complete the transaction is received via the computing platform or via the mobile device.

Embodiment 118

The system of embodiment 98 wherein sending the user's payment information includes sending the information via a session established between the mobile backend server and the POS terminal, the session being associated with the electronic transaction that was requested by the user.

Embodiment 119

The system of embodiment 98 wherein the payment information communicated between the mobile device and the mobile backend server is encoded such that one portion of the data cannot be modified or tampered with without causing another portion of the data to also be modified.

Embodiment 120

The system of embodiment 119 wherein encoding the payment information communicated between the mobile device and the mobile backend server includes providing the payment information as an in input into at least one of an encryption function, a mathematical function, or a mapping function, the output of which is communicated.

Embodiment 121

The system of embodiment 98 wherein the payment information comprises a token that represents payment information and wherein the POS terminal redeems the token to determine the payment information.

Embodiment 122

The system of embodiment 98 wherein the payment information includes information that identifies a financial institution.

Embodiment 123

The system of embodiment 98 wherein the payment information includes a name of the user or information identifying the user's membership in a loyalty, rewards, or discount program.

Embodiment 124

The system of embodiment 98 wherein the requested electronic transaction comprises a "card present" transaction.

Embodiment 125

The system of embodiment 98 wherein the requested electronic transaction comprises a payment transaction or a non-payment transaction.

Embodiment 126

The system of embodiment 98 wherein the requested ecommerce transaction comprises at least one of: a payment or purchase; a credit transaction; a debit transaction; a deposit; a withdrawal; a money transfer; a transaction involving a loyalty program; a transaction involving a rewards program; and a transaction involving a diet, health, or fitness program; a transaction involving coupons and offers; money collection; funds collection; utility payments; automatic payments; automatic drafts; scheduled withdrawals; and recurring payments.

Embodiment 127

A non-transitory computer readable medium having stored thereon executable instructions that when executed by the processor of a computer control the computer to perform steps comprising: at a mobile device, receiving a point of sale terminal identifier (POSID) that identifies a point of sale terminal of a merchant, and sending the POSID to a mobile backend server for storing and maintaining user payment information; and at the mobile backend server, identifying the user, determining payment information for the identified user, and sending the user's payment information to the point of sale terminal identified by the POSID for use to complete the transaction.

Embodiment 128

A method for using a mobile device to effect a secure electronic transaction, the method comprising, at a mobile backend server comprising one or more processors: receiving, from a mobile device of a user that is engaged in or desires to engage in an electronic transaction with an entity other than the user, first information that identifies the user and second information that identifies the entity; using the first information to identify the user; determining user payment information for the identified user; using the second information to identify the entity; and sending the user payment information to the identified entity for use to initiate the electronic transaction.

Embodiment 129

The method of embodiment 128 wherein the identified entity comprises a merchant backend server.

Embodiment 130

The method of embodiment 128 wherein the identified entity comprises a merchant ecommerce server.

Embodiment 131

The method of embodiment 128 wherein the identified entity comprises a payment server that is hosting the payment process.

Embodiment 132

The method of embodiment 128 wherein the second information includes at least one of: a session ID; a uniform resource identifier or network address of the mobile backend server; information identifying the computing platform; information identifying the session owner; and information identifying the user.

Embodiment 133

The method of embodiment 128 wherein the second information was received by the mobile device via transmission by visual image, transmission by audio transmission, by wireless transmission, or by manual entry.

Embodiment 134

The method of embodiment 128 wherein the mobile backend server receives the first and second information via a session established with the mobile device.

Embodiment 135

The method of embodiment 128 wherein the mobile backend server also receives from the mobile device a payment preference of the user, which the mobile backend server uses to determine payment information for the user.

Embodiment 136

The method of embodiment 128 wherein the mobile backend server also receives from the mobile device a shipping preference of the user, which the mobile backend server uses to determine shipping instructions for the user.

Embodiment 137

The method of embodiment 136 comprising, prior to sending the user payment information to the identified entity: sending, by the mobile backend server, shipping instructions to the identified entity; sending, by the identified entity to the user, a total payment amount for the transaction, including at least one of shipping fees and taxes levied; and receiving, from the user, authorization to complete the transaction.

Embodiment 138

The method of embodiment 137 wherein receiving authorization to complete the transaction includes authenticating the user of the mobile device.

Embodiment 139

The method of embodiment 138 wherein authenticating the user includes receiving, at the mobile device, identification information for identifying the user and authentication information for authenticating the identity of the user and using the authentication information to authenticate the identity of the user.

Embodiment 140

The method of embodiment 139 wherein the information for identifying or authenticating the identity of the user includes at least one of: a name of the user; an address of the user; an identification number associated with the user; biometric information provided by the user; a password, passcode, or personal information number (PIN) of the user; a digital signature of the user, a geo-location of the user, or information from the user's social network.

Embodiment 141

The method of embodiment 139 wherein authentication of the identity of the user is performed by the mobile device.

Embodiment 142

The method of embodiment 139 comprising, at the back-end mobile server, receiving from the mobile device identification information and authentication information and using the received information to authenticate the user.

Embodiment 143

The method of embodiment 139 wherein the identification or authentication information is provided by the user or by entity different from the user.

Embodiment 144

The method of embodiment 137 wherein the authorization to complete the transaction is received via the computing platform or via the mobile device.

Embodiment 145

The method of embodiment 128 wherein sending the user payment information includes sending the information via a session established between the mobile backend server and the identified entity.

Embodiment 146

The method of embodiment 128 wherein the user payment information comprises a token that represents payment information to be redeemed by the identified entity to determine the payment information.

Embodiment 147

The method of embodiment 128 wherein the payment information includes information that identifies a financial institution.

Embodiment 148

The method of embodiment 128 wherein the payment information includes a name of the user or information identifying the user's membership in a loyalty, rewards, or discount program.

Embodiment 149

The method of embodiment 128 wherein the electronic transaction comprises a "card present" transaction.

Embodiment 150

The method of embodiment 128 wherein the electronic transaction comprises a payment transaction or a non-payment transaction.

Embodiment 151

The method of embodiment 150 wherein the requested ecommerce transaction comprises at least one of: a payment or purchase; a credit transaction; a debit transaction; a deposit; a withdrawal; a money transfer; a transaction involving a loyalty program; a transaction involving a rewards program; a transaction involving a diet, health, or fitness program; a transaction involving coupons and offers; a transaction involving money collection; a transaction involving funds collection; a transaction involving utility payments; a transaction involving automatic payments; a transaction involving automatic drafts; a transaction involving scheduled withdrawals; and a transaction involving recurring payments.

What is claimed is:

1. A method comprising:
at a mobile backend server comprising one or more processors:
receiving, from a first mobile device of a first user that is engaged in or desires to engage in a first electronic transaction with an entity other than the first user, first information that identifies the first user and second information that directly or indirectly identifies the first electronic transaction, wherein the second information does not contain payment information for the first user;
using the first information to identify the first user and an account associated with the first user and a second user;
determining whether the first electronic transaction complies with a first rule of the account, wherein the first rule is associated with the first user but not with the second user;
responsive to determining that the first electronic transaction complies with the first rule, performing the following comprising:
using a first payment preference associated with the first user and stored in a private database of the mobile backend server to determine first user payment information for the first user, wherein the first user payment information comprises a token that represents payment information to be redeemed by a first target to determine the first user payment information;
using the second information to identify the first target for the first user payment information, the first target comprising a payment server that is hosting a payment process that is associated with the first electronic transaction; and
sending the first user payment information for the first user that comprises the token from the mobile backend server to the first target comprising the payment server for use to initiate the first electronic transaction.

2. The method of claim 1, wherein the entity other than the first user comprises: an ecommerce website; a point of sale (POS) terminal; a kiosk; an unattended terminal; an automatic teller machine (ATM); a print advertisement; a social media webpage; a product display; or an image of a good or service.

3. The method of claim 1, wherein the first target comprising the payment server that is hosting the payment process that is associated with the electronic transaction comprises: a POS terminal; merchant backend server; or a merchant ecommerce server.

4. The method of claim 1, wherein the second information includes at least one of: a session ID; a uniform resource identifier or network address of the mobile backend server; information identifying a computing platform; information identifying a session owner; or information identifying the first user.

5. The method of claim 1, wherein the second information was received by the first mobile device via visual transmission.

6. The method of claim 5, wherein the second information was received by the first mobile device as a QR code.

7. The method of claim 6, wherein the QR code was provided by the entity other than the first user.

8. The method of claim 5, wherein the second information was received by the first mobile device comprises a graphic image containing the second information embedded as steganographic information.

9. The method of claim 1, wherein the second information was received by the first mobile device via audio transmission, wireless transmission, or manual entry.

10. The method of claim 1, wherein the second information was received by the first mobile device as a media file.

11. The method of claim 1, wherein the mobile backend server receives the first and second information via a session established with the first mobile device.

12. The method of claim 1, wherein the mobile backend server received the first payment preference of the first user from the first mobile device.

13. The method of claim 1, further comprising:
using a shipping preference of the first user and stored in the private database of the mobile backend server to determine shipping instructions for the first user, wherein the mobile backend server received at least one of the first payment preference of the first user or the shipping preference of the first user from the first mobile device.

14. The method of claim 1, further comprising:
sending shipping instructions for the first user to the first target; and
prior to sending the first user payment information and the shipping instructions for the first user to the first target by the mobile backend server:
sending the shipping instructions to the first target;
receiving from the first target a total payment amount for the first electronic transaction, including at least one of shipping fees and taxes levied;
sending the total payment amount to the first user; and
receiving authorization to complete the first electronic transaction from the first user.

15. The method of claim 1, wherein receiving authorization to complete the first electronic transaction includes authenticating the first user of the first mobile device.

16. The method of claim 15, wherein authenticating the first user includes receiving notification from the first mobile device that the first user was authenticated.

17. The method of claim 15, wherein authenticating the first user includes receiving information with which the mobile backend server authenticates the first user.

18. The method of claim 17, wherein the first information for identifying or authenticating the identity of the first user includes at least one of: a name of the first user; an address of the first user; an identification number associated with the first user; biometric information provided by the first user; a password, passcode, or personal information number (PIN) of the first user; a digital signature of the first user; a geo-location of the first user; or information from the first user's social network.

19. The method of claim 1, wherein sending the first user payment information includes sending the first user payment information via a session established between the mobile backend server and the first target.

20. The method of claim 1, wherein the first user payment information includes at least one of: information that identifies a financial institution; a name of the first user; or information identifying the first user's membership in a loyalty, rewards, or discount program.

21. The method of claim 1, wherein the first electronic transaction comprises a "card present" transaction.

22. The method of claim 1, wherein the first electronic transaction comprises a payment transaction or a non-payment transaction.

23. The method of claim 22, wherein the first electronic transaction comprises at least one of: a payment or purchase; a credit transaction; a debit transaction; a deposit; a withdrawal; a money transfer; a transaction involving a loyalty program; a transaction involving a rewards program; a transaction involving a diet, health, or fitness program; a transaction involving coupons and offers; a transaction involving funds collection; a transaction involving utility payments; a transaction involving automatic payments or drafts; a transaction involving scheduled withdrawals; or a transaction involving recurring payments.

24. The method of claim 1, wherein the first or second information is encoded such that one portion of the first or second information cannot be modified or tampered with without causing another portion of the first or second information to also be modified.

25. The method of claim 1, wherein the second information includes a sequence counter to prevent replay attacks.

26. The method of claim 1, further comprising:
receiving, from a second mobile device of a second user that is engaged in or desires to engage in a second electronic transaction with a second entity other than the second user, third information that identifies the second user and fourth information that directly or indirectly identifies the second electronic transaction, wherein the fourth information does not contain payment information for the second user;
using the third information to identify the second user and the account associated with the first user and the second user;
determining whether the second electronic transaction complies with a second rule of the account, wherein the second rule is associated with the second user but not the with the first user;
responsive to determining that the second electronic transaction complies with the second rule, performing the following comprising:
using a second payment preference associated with the second user and stored in the private database of the mobile backend server to determine second user payment information for the second user;
using the fourth information to identify a second target for the second user payment information, the second target comprising a second payment server that is hosting a second payment process that is associated with the second electronic transaction; and
sending the second user payment information for the second user to the second target for use to initiate the second electronic transaction.

27. A mobile backend server comprising:
one or more processors; and
memory storing instructions executable by the one or more processors, whereby the mobile backend server is operable to:
receive, from a first mobile device of a first user that is engaged in or desires to engage in a first electronic transaction with an entity other than the first user, first information that identifies the first user and second information that directly or indirectly identifies the first electronic transaction, wherein the second information does not contain payment information for the first user;
use the first information to identify the first user and an account associated with the first user and a second user;
determine whether the first electronic transaction complies with a first rule of the account, wherein the first rule is associated with the first user but not the with the second user;
responsive to determining that the first electronic transaction complies with the first rule, perform the following comprising:
use a first payment preference associated with the first user and stored in a private database of the mobile backend server to determine first user payment information for the first user, wherein the first user payment information comprises a token that represents payment information to be redeemed by a first target to determine the first user payment information;
use the second information to identify the first target for the first user payment information, the first target comprising a payment server that is hosting a payment process that is associated with the first electronic transaction; and
send the first user payment information for the first user that comprises the token from the mobile backend server to the first target comprising the payment server for use to initiate the first electronic transaction.

28. The mobile backend server of claim 27, wherein the entity other than the first user comprises: an ecommerce website; a point of sale (POS) terminal; a kiosk; an unattended terminal; an automatic teller machine (ATM); a print advertisement; a social media webpage; a product display; or an image of a good or service.

29. The mobile backend server of claim 27, wherein the first target comprising the payment server that is hosting the payment process that is associated with the first electronic transaction comprises a: a POS terminal; merchant backend server; or a merchant ecommerce server.

30. The mobile backend server of claim 27, wherein the second information includes at least one of: a session ID; a uniform resource identifier or network address of the mobile backend server; information identifying a computing platform; information identifying a session owner; and information identifying the first user.

31. The mobile backend server of claim 27, wherein the second information was received by the first mobile device via visual transmission.

32. The mobile backend server of claim 31, wherein the second information was received by the first mobile device as a QR code.

33. The mobile backend server of claim 32, wherein the QR code was provided by the entity other than the first user.

34. The mobile backend server of claim 31, wherein the second information was received by the first mobile device comprises a graphic image containing the second information embedded as steganographic information.

35. The mobile backend server of claim 27, wherein the second information was received by the first mobile device via audio transmission, wireless transmission, or manual entry.

36. The mobile backend server of claim 27, wherein the second information was received by the first mobile device as a media file.

37. The mobile backend server of claim 27, wherein the mobile backend server receives the first and second information via a session established with the first mobile device.

38. The mobile backend server of claim 27, wherein the mobile backend server received the first payment preference of the first user from the first mobile device.

39. The mobile backend server of claim 27, wherein the mobile backend server is further operable to:
use a shipping preference of the first user and stored in the private database of the mobile backend server to determine shipping instructions for the first user, wherein the mobile backend server received at least one of the first payment preference of the first user or the shipping preference of the first user from the first mobile device.

40. The mobile backend server of claim 27 comprising, wherein the mobile backend server is further operable to:
send shipping instructions for the first user to the first target; and
prior to sending the first user payment information and the shipping instructions for the first user to the first target:
send the shipping instructions to the first target;
receive from the first target a total payment amount for the first electronic transaction, including at least one of shipping fees and taxes levied;
send the total payment amount to the first user; and
receive authorization to complete the first electronic transaction from the first user.

41. The mobile backend server of claim 27, wherein receiving authorization to complete the first electronic transaction includes authenticating the first user of the first mobile device.

42. The mobile backend server of claim 41, wherein authenticating the first user includes receiving notification from the first mobile device that the first user was authenticated.

43. The mobile backend server of claim 41, wherein authenticating the first user includes receiving information with which the mobile backend server authenticates the first user.

44. The mobile backend server of claim 43, wherein the first information for identifying or authenticating the identity of the first user includes at least one of: a name of the first user; an address of the first user; an identification number associated with the first user; biometric information provided by the first user; a password, passcode, or personal information number (PIN) of the first user; a digital signature of the first user; a geo-location of the first user; or information from the first user's social network.

45. The mobile backend server of claim 27, wherein sending the first user payment information includes sending the first user payment information via a session established between the mobile backend server and the first target.

46. The mobile backend server of claim 27, wherein the first user payment information includes at least one of: information that identifies a financial institution; a name of the first user; or information identifying the first user's membership in a loyalty, rewards, or discount program.

47. The mobile backend server of claim 27, wherein the first electronic transaction comprises a "card present" transaction.

48. The mobile backend server of claim 27, wherein the first electronic transaction comprises a payment transaction or a non-payment transaction.

49. The mobile backend server of claim 48, wherein the first electronic transaction comprises at least one of: a payment or purchase; a credit transaction; a debit transaction; a deposit; a withdrawal; a money transfer; a transaction involving a loyalty program; a transaction involving a rewards program; a transaction involving a diet, health, or fitness program; a transaction involving coupons and offers; a transaction involving funds collection; a transaction involving utility payments; a transaction involving automatic payments or drafts; a transaction involving scheduled withdrawals; and a transaction involving recurring payments.

50. The mobile backend server of claim 27, wherein the first or second information is encoded such that one portion of the first information or second information cannot be modified or tampered with without causing another portion of the first information or second information to also be modified.

51. The mobile backend server of claim 27, wherein the second information includes a sequence counter to prevent replay attacks.

52. The mobile backend server of claim 27, wherein the mobile backend server is further operable to:
receive, from a second mobile device of a second user that is engaged in or desires to engage in a second electronic transaction with a second entity other than the second user, third information that identifies the second user and fourth information that directly or indirectly identifies the second electronic transaction, wherein the fourth information does not contain payment information for the second user;
use the third information to identify the second user and the account associated with the first user and the second user;
determine whether the second electronic transaction complies with a second rule of the account, wherein the second rule is associated with the second user but not the with the first user;
responsive to determining that the second electronic transaction complies with the second rule, perform the following comprising:
use a second payment preference associated with the second user and stored in the private database of the mobile backend server to determine second user payment information for the second user;
use the fourth information to identify a second target for the second user payment information, the second target comprising a second payment server that is hosting a second payment process that is associated with the second electronic transaction; and
send the second user payment information for the second user to the second target for use to initiate the second electronic transaction.

53. A non-transitory computer readable medium having stored thereon executable instructions that when executed by a processor of a computer control the computer to perform operations comprising:

receiving, from a first mobile device of a first user that is engaged in or desires to engage in a first electronic transaction with an entity other than the first user, first information that identifies the first user and second information that directly or indirectly identifies the first electronic transaction, wherein the second information does not contain payment information for the first user;

using the first information to identify the first user and an account associated with the first user and a second user;

determining whether the first electronic transaction complies with a first rule of the account, wherein the first rule is associated with the first user but not the with the second user;

responsive to determining that the first electronic transaction complies with the first rule, performing the following comprising:

using a first payment preference associated with the first user and stored in a private database of a mobile backend server to determine first user payment information for the first user, wherein the first user payment information comprises a token that represents payment information to be redeemed by a first target to determine the first user payment information;

using the second information to identify the first target for the payment information, the first target comprising a payment server that is hosting a payment process that is associated with the first electronic transaction; and sending the first user payment information for the first user that comprises the token from the mobile backend server to the first target comprising the payment server for use to initiate the first electronic transaction.

54. The non-transitory computer readable medium of claim 53, the operations further comprising:

receiving, from a second mobile device of a second user that is engaged in or desires to engage in a second electronic transaction with a second entity other than the second user, third information that identifies the second user and fourth information that directly or indirectly identifies the second electronic transaction, wherein the fourth information does not contain payment information for the second user;

using the third information to identify the second user and the account associated with the first user and the second user;

determining whether the second electronic transaction complies with a second rule of the account, wherein the second rule is associated with the second user but not the with the first user;

responsive to determining that the second electronic transaction complies with the second rule, performing the following comprising:

using a second payment preference associated with the second user and stored in the private database of a mobile backend server to determine second user payment information for the second user;

using the fourth information to identify a second target for the second user payment information, the second target comprising a second payment server that is hosting a second payment process that is associated with the second electronic transaction; and sending the second user payment information for the second user to the second target for use to initiate the second electronic transaction.

* * * * *